(12) United States Patent  
Griggs et al.

(10) Patent No.: US 9,318,149 B2  
(45) Date of Patent: Apr. 19, 2016

(54) METHOD AND SYSTEM OF COMPOSITE BROADCAST CONTROL

(71) Applicant: GVBB HOLDINGS S.A.R.L., Luxembourg (LU)

(72) Inventors: David Robert Griggs, Portland, OR (US); David Guy Sabine, Portland, OR (US)

(73) Assignee: GVBB Holdings S.A.R.L., Luxembourg (LU)

( * ) Notice: Subject to any disclaimer, the term of this patent is extended or adjusted under 35 U.S.C. 154(b) by 33 days.

(21) Appl. No.: 13/843,302

(22) Filed: Mar. 15, 2013

(65) Prior Publication Data

US 2014/0248031 A1    Sep. 4, 2014

Related U.S. Application Data

(60) Provisional application No. 61/771,681, filed on Mar. 1, 2013.

(51) Int. Cl.
*G06F 3/00* (2006.01)
*G11B 27/028* (2006.01)
(Continued)

(52) U.S. Cl.
CPC .............. *G11B 27/028* (2013.01); *G11B 27/36* (2013.01); *H04H 60/04* (2013.01); *H04N 5/262* (2013.01); *H04N 5/265* (2013.01); *H04N 5/2625* (2013.01);
(Continued)

(58) Field of Classification Search
CPC ...... G11B 27/105; G11B 27/34; H04N 5/775; H04N 5/44543

USPC .......... 386/223, 230, 239; 715/202, 719, 721, 715/723; 345/474
See application file for complete search history.

(56) References Cited

U.S. PATENT DOCUMENTS 4,514,818 A    4/1985    Walker
4,602,286 A    7/1986    Kellar et al.
(Continued)

FOREIGN PATENT DOCUMENTS

DE    19625954 A1    1/1998
EP    0360576 A1    3/1990
(Continued)

OTHER PUBLICATIONS

Patent Examination Report No. 1 dated Nov. 1, 2012, regarding Australian Application No. 2010221788.
(Continued)

*Primary Examiner* — Thai Tran
*Assistant Examiner* — Mishawn Hunter
(74) *Attorney, Agent, or Firm* — Arent Fox LLP

(57) ABSTRACT

A method, a system, an apparatus, and a computer program product for composite broadcast control are provided. The apparatus or system presents broadcast control options to a user as a plurality of fundamental production elements, the plurality of fundamental production elements comprising at least one of a background an effect, a transition, and a stored clip, wherein the background can be combined with any of the effect, the transition, and the stored clip. The apparatus/system receives a selection from a user of fundamental production elements, and thereafter builds a composited scene by layering the selected production elements. The apparatus may display a preview of the composited scene prior to selection of the composited scene for output.

30 Claims, 17 Drawing Sheets

(51) Int. Cl.
*G11B 27/36* (2006.01)
*H04H 60/04* (2008.01)
*H04N 5/262* (2006.01)
*H04N 5/265* (2006.01)
*H04N 21/234* (2011.01)
*H04N 21/2343* (2011.01)
*H04N 21/80* (2011.01)

(52) U.S. Cl.
CPC . *H04N 21/23412* (2013.01); *H04N 21/234327* (2013.01); *H04N 21/80* (2013.01)

(56) References Cited

U.S. PATENT DOCUMENTS

| | | | |
|---|---|---|---|
| 4,720,805 A | 1/1988 | Vye | |
| 5,327,161 A | 7/1994 | Logan et al. | |
| 5,477,024 A | 12/1995 | Share et al. | |
| 5,685,634 A | 11/1997 | Mulligan | |
| 6,154,600 A | 11/2000 | Newman et al. | |
| 6,204,840 B1 * | 3/2001 | Petelycky et al. | 715/202 |
| 6,952,221 B1 * | 10/2005 | Holtz et al. | 715/723 |
| 7,024,677 B1 | 4/2006 | Snyder | |
| 7,073,127 B2 | 7/2006 | Zhao et al. | |
| 7,325,199 B1 | 1/2008 | Reid | |
| 7,824,067 B2 | 11/2010 | Martineau et al. | |
| 2001/0043219 A1 * | 11/2001 | Robotham et al. | 345/474 |
| 2002/0059625 A1 | 5/2002 | Kurauchi | |
| 2002/0175931 A1 | 11/2002 | Holtz et al. | |
| 2003/0204850 A1 | 10/2003 | Ng et al. | |
| 2003/0214605 A1 | 11/2003 | Snyder | |
| 2007/0182864 A1 | 8/2007 | Stoneham | |
| 2009/0187826 A1 | 7/2009 | Heimbold | |
| 2011/0249023 A1 | 10/2011 | Nakamura | |

FOREIGN PATENT DOCUMENTS

| | | |
|---|---|---|
| EP | 0360432 B1 | 7/1994 |
| GB | 2252473 A | 8/1992 |
| JP | 09-154047 A1 | 6/1997 |
| WO | 0060852 A1 | 10/2000 |
| WO | 0152526 A1 | 7/2001 |

OTHER PUBLICATIONS

International Search Report regarding EP 12177056.4 dated Jan. 20, 2014 (all references cited in ISR were provided in previous IDS for this US application).

International Search Report and Written Opinion mailed May 21, 2014 regarding PCT/EP2014/053887.

European Patent Office of Netherlands, Application No. 04725240.8-1241 / 16344440, Mar. 22, 2010.

International Search Report of PCT/AU2004/000441, mailed May 4, 2004.

Written Opinion of the International Searching Authority, PCT/AU2004/000441, mailed Apr. 2, 2004.

* cited by examiner

METHOD AND SYSTEM OF COMPOSITE BROADCAST CONTROL

CROSS-REFERENCE TO RELATED APPLICATION

This application claims the benefit of U.S. Provisional Application Ser. No. 61/771,681, entitled "METHOD AND SYSTEM OF COMPOSITE BROADCAST CONTROL" and filed on Mar. 1, 2013, which is expressly incorporated by reference herein in its entirety.

BACKGROUND

1. Field

The present disclosure relates generally to a method, system, apparatus, and computer program product for composite broadcast control.

2. Background

Television production involves assembling source material such as the input from one or more cameras, video and audio into sequences with defined transitions or graphics, to create a program. Source material for live broadcast is typically captured from multiple cameras, video servers, pre-produced material and graphics, assembled and then broadcast directly from a control room or stored for broadcast at a later date.

A vision switcher operator typically follows a director's commands and operates a large and complex vision switching panel positioned in front of the first bank of video monitors to mix and switch all picture sources including live camera feeds, replays and graphics which make up a program. The vision switcher is also responsible for creating most of the digital video effects (DVE's) which are produced electronically by an associated DVE panel which may be built into the vision switcher. Typically, the vision switcher panel is rigidly built into the control room. The vision switching system is typically made up of a mixer frame and complex panel. Memory recall procedures on the panel are usually complex with poorly identified descriptors requiring the operator to remember significant detail about what is stored where, and requiring the operator to perform multiple keystrokes to recall programmed elements. Moreover, the vision switcher is usually required to integrate the individual video sources into a sequence, adding the transitions in a manual process under the supervision of the Director. Typically all switching has been performed using button presses on the panel. Operation of such a switching panel requires the vision switcher to consider the resources available to the switching panel, including keyers, mix effects units, etc. The vision switcher/operator must have the knowledge to work within these constraints in order to obtain their desired results. For example, the vision switcher may have to reuse multiple mix effect units in order to obtain a desired result. The vision switcher must understand the keystrokes necessary to manually connect inputs/outputs through the use of buttons in order to obtain the desired path.

Thus, the operation of such a vision switcher and other broadcast controls requires a skilled operator with a technical background. Additionally, the technical aspects of switching limit the ability of the vision switcher to think more creatively.

SUMMARY

In an aspect of the disclosure, a method, a system, a computer program product, and an apparatus are provided. The apparatus or system presents broadcast control options to a user as a plurality of fundamental production elements, the plurality of fundamental production elements comprising at least a background element, and optionally combined with effects, a transition, and stored clips. The apparatus/system receives a selection from a user of fundamental production elements, and thereafter builds a composited scene by layering the selected production elements.

The broadcast control options may be visually presented to the user as icons on a touch screen. The broadcast control options may be presented to the user via programmable manual buttons. The manual buttons may also include a display that indicates the broadcast control option by the user.

The composited scene may be built via graphics processing unit having a software based architecture. Such software based architecture may provide a single path that receives all video input for broadcast control and provides video outputs for broadcast.

The composited scene may be built within a previewer, and the apparatus/system may display a preview of the composited scene prior to broadcasting the composited scene. The preview may enable the user to make changes to the composited scene. Thus, the apparatus/system may further receive a user selection modifying the composited scene, and display the modified preview of the composited scene prior to broadcasting the composited scene.

Once the user is satisfied with the preview of the composited scene, the apparatus/system may receive a selection to output the composited scene for which a preview is displayed and output the composited scene for broadcast.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
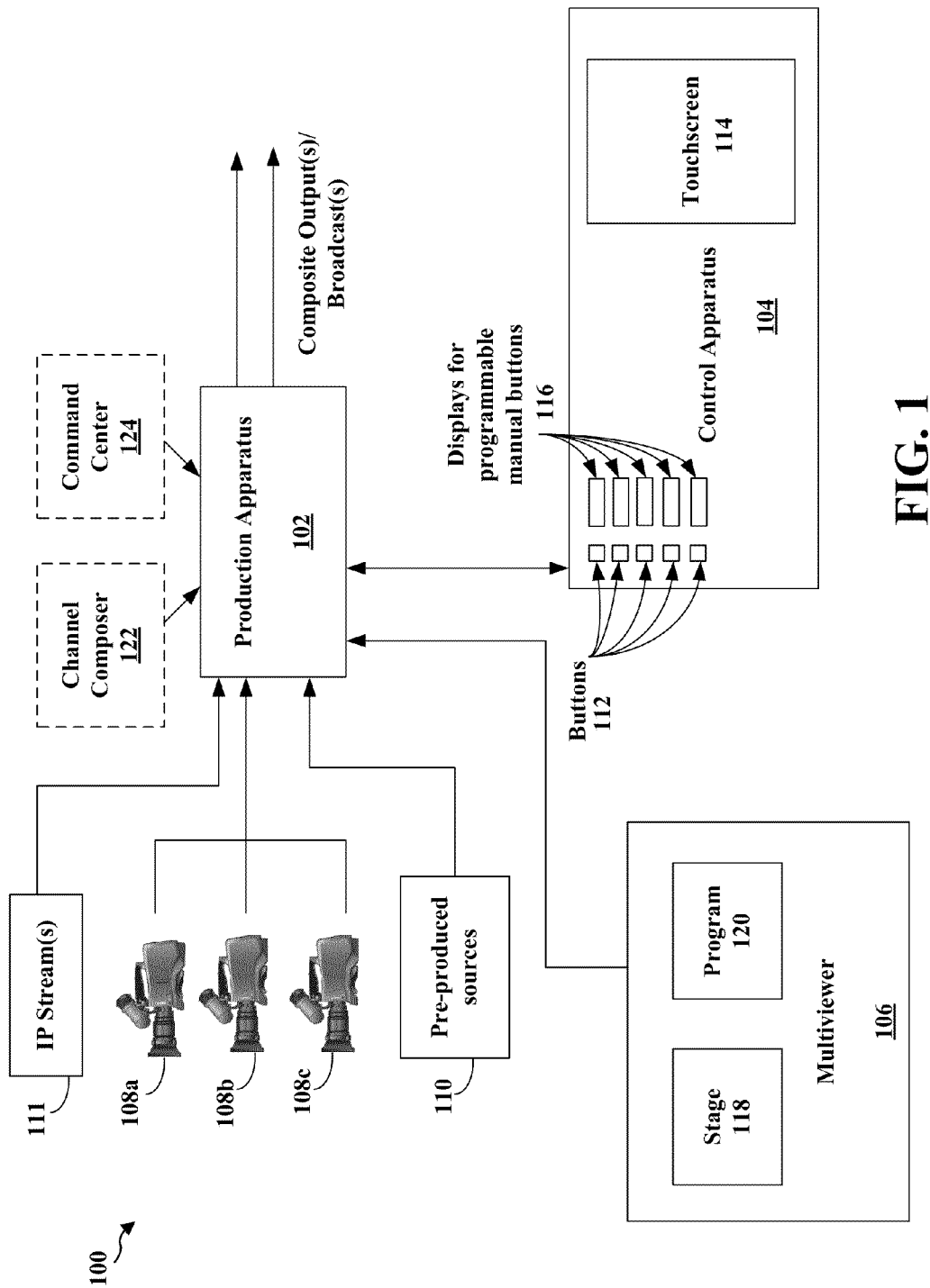
FIG. 1 illustrates an example diagram of a broadcast control system in accordance with aspects presented herein.

FIG. 1 illustrates an example diagram of a broadcast control system 100. The broadcast control system provides an integrated, non-linear production solution having combined functionality of any combination of switcher functionality, video server/clip store functionality, graphics engine functionality, and multi-viewer functionality. Production elements provided via the integrated, non-linear production solution provide a simplified way of working with the main building blocks of live production. They allow an operator to think in a more creative workspace and be removed from the technical aspects of production.

The switcher functionality provides, among others, transitions and layered effects.

The video server/clip store functionality provides, among others, ingest and playout of video clips, stills, and other pre-produced material.

The graphic engine functionality provides, among others, real time 2D/3D graphics, overlays, and authoring tools. Such graphics may include simple graphic elements such as logos, as well as more complex graphics such as sports scores, final standings for events being broadcast, and other complex effects having sources from different sources.

The multi-viewer functionality provides, among others, live monitoring of inputs/outputs. Each of these aspects of functionality may be integrated and presented to an operator via a simplified user interface. This simplified user interface may comprise live production workflows that enable an operator to make live broadcast production decisions in a more intuitive manner.

Figure 3:
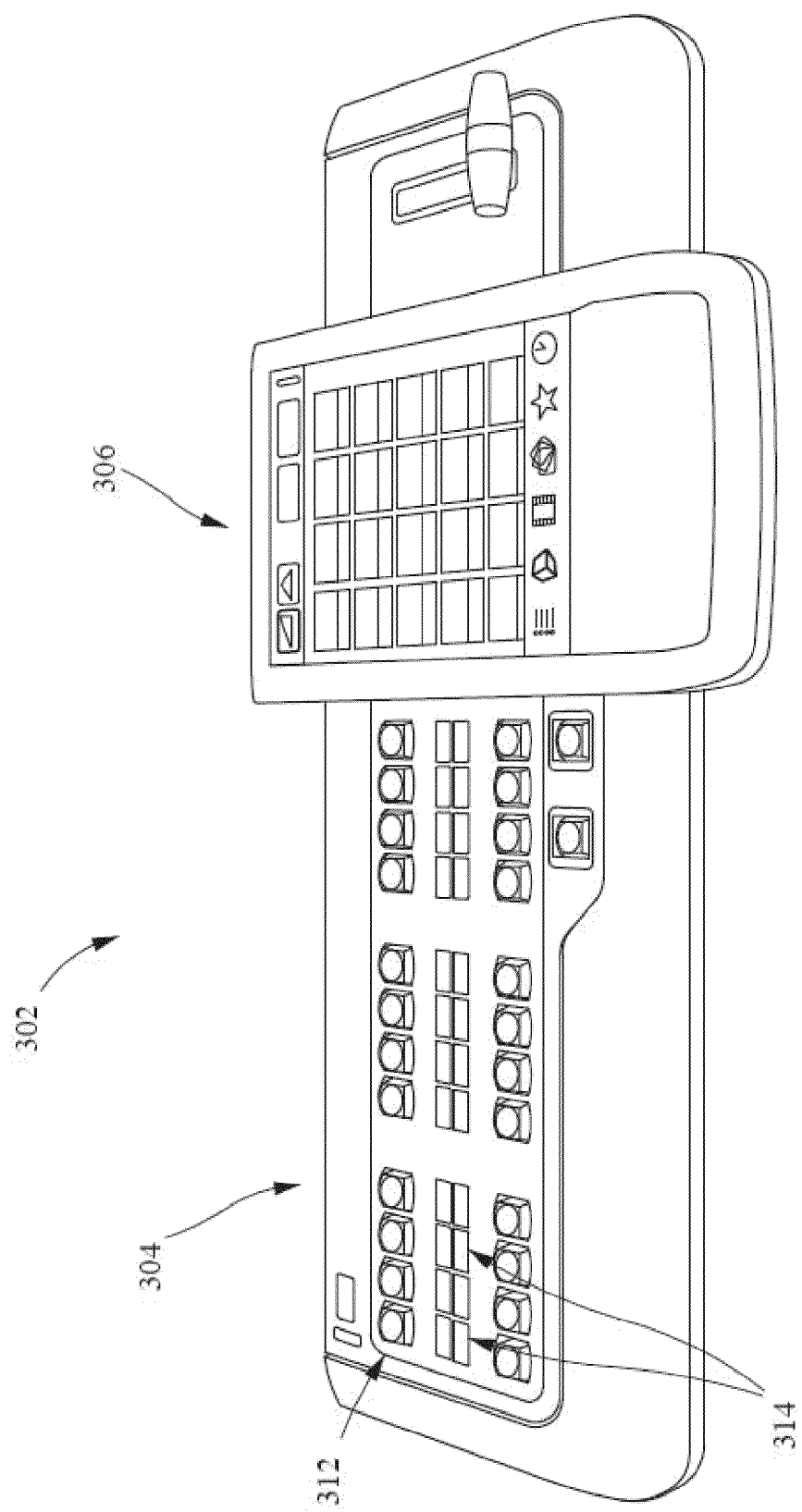
FIG. 3 illustrates an example control apparatus in accordance with aspects presented herein.

The broadcast system 100 may receive inputs from multiple live sources 108a, b, and c, such as live input from multiple cameras. The broadcast system 100 may also have access to other pre-produced sources 110, such as stored video or audio clips. Among others, sources may also be delivered via SDI or internet protocol (IP) streaming 111. The input sources may be received at a production apparatus 102. Production apparatus may be connected to a control apparatus 104 that is configured to receive user selections of production elements. Control apparatus 104 may include a user interface, including any combination of manual buttons 112 and a touch screen user interface 114. The control apparatus may include a display 116 corresponding to each of the programmable buttons, each display providing a description or representation of the button as programmed. Composite output(s) may also be provided via IP streaming, among other manners of output. FIG. 3 illustrates an example control apparatus, and FIGS. 5-14 illustrate example screen shots that may be presented to a user via control apparatus 104.

The control apparatus may be configured to both present broadcast control options to a user as a plurality of fundamental production elements, and to receive a user selection of production elements from the user. The user selection may then be provided to the production apparatus 102 so that the production apparatus 102 can build a composite scene by layering each of the selected production elements.

As an example, video aspects of live television production may be organized into broad categories including:

Backgrounds, e.g., full screen video such as video from live cameras or pre-produced clips.

Graphics or effects, e.g., graphical elements layered on top of background elements to enhance the overall quality of the output. Among others, such graphics may include a score graphic in a sports production, a two box effect in a news production, a logo, etc.

Transitions, e.g., ways of changing from one background to another. Such transitions may include, among others, cuts, mixes, and wipes. Cuts involve simply switching from one background to another over one frame of duration. A mix comprises, e.g., a more complex transition, e.g., a slower, perceivable fade from one background to another. A wipe comprises, e.g., a perceivable move from one background to another. For example, a wipe may involve the incoming background typically sliding in from one side of the screen.

The layering of these elements may enable an operator to create the look and feel desired for the production in an intuitive manner. These 'layers' can be turned off or on during the production dynamically allowing for a rich and interesting output.

Layering may provide a user experience more similar to other file-based, non-linear workflows in other domains. The selection of an operator of one or more production elements results in a layers appearing on an output.

In an aspect, a graphics engine may be used to perform the layering.

Layering may further include creating a combination of production elements, and saving the combination as a new, single production element. This new production element may be presented to the user as a new icon or as a newly programmed manual button.

Creating complex video output typically involves knowing a limited set of resources of mix effects units, keyers, etc. The operator needs to know the abilities and limits of the equipment in order to creatively work within the constraints. This often involves reusing multiple mix effects units to obtain a desired result.

Through the use of layering provided by broadcast control system 100 in accordance with aspects presented herein, the operator may be provided with a nearly unlimited set of resources/layers that can be used to create outputs. This allows the operator to focus on the creative aspects of the broadcast rather than the technical constrains of the equipment.

The production apparatus 102 and the control apparatus may be operatively connected to a multiviewer 106 that presents the user at least a preview of the composited scene based on their selection of production elements. For example, the preview may be displayed in a stage window 118 of multiviewer 106. The operator can then modify the previously built composite scene by changing selections at the control apparatus. As the operator makes the changes, the stage window 118 updates the display to show a modified version of the composited scene. Thus, the stage 118 continuously shows a current version of the composited scene. This allows an operator to build and preview a scene without being on air. The developed scene can then be used for the actual broadcast through a single selection, with one hit of a button.

When the operator is satisfied, the operator can make a selection to output the composited scene, e.g., for broadcast. This selection may be a single touch selection to a button or touch screen. For example, the operator may select an output button or icon. Alternately, the operator may select the stage for output by applying finger pressure to a display of the stage, e.g., at multiviewer 106. Upon such a selection, all selected production elements may be applied and output.

Thus, broadcast controls may be provided to the operator via any combination of icons or manual buttons as an organized group of fundamental production elements. An example of production element groups includes background, graphics, transitions, and video clips. The background production element may include options of video source input that can be applied to as a background of a broadcast.

Thus, the operator can apply and/or remove a production element through a simple press of a button. For example, if the operator wants to show a score for a sport event. The operator may press a button or select an icon that indicates "score." Pushing or selecting it again, causes the score to be removed from the composited scene. The operator may apply the score to either the preview or directly to the broadcast being output. To apply the score to the current output, the operator selects the current output and pushes the score button. The current output option may be provided as a window showing the current output or as an icon that indicates the current output by a label.

By organizing all of the broadcast control options into a small set of fundamental production elements, the user interface provides a streamlined set of options to an operator rather than emulating a traditional switcher or mix effects unit experience.

The multiviewer may include an additional window 120, e.g., a program window, that illustrates the current broadcast. The multiviewer may additionally provide the operator with a display of other items, such as the input received from the different input sources 108, 110. The multiviewer may comprise a display or a touch screen display that further receives a user selection of input sources or of an acceptance of the composited scene illustrated via the stage 118.

The programmable buttons provide a blank canvas that an operator can customize to their desired uses. This enables the operator to spend more time thinking about the creative aspects of the broadcast than about the process needed to obtain such creative aspect.

Graphics, transitions, effects, etc. may be created and sent to the broadcast control system 100 during pre-production. The available graphics, transitions, effects, etc. may then be presented to the operator as part of the available production elements. During live production such graphics, transitions, effects, sources of video, still, and audio media may be grouped and presented via the user interface as available production elements. The live show can then be created simply by selecting and combining those production elements.

In addition to the control apparatus 104, a channel composer 122 and/or a command center 124 may be operatively connected to the production apparatus 102. The channel composer 122 and the command center 124 may be located remotely from other aspects of the system.

The command center 124 may input basic changes such as text, text size/color, positioning of the graphics, etc. during live production. This may be accomplished, e.g., online from a production surface or from a command center via an external user interface provided by the system. The command center may comprise an external user interface for the system 100. The user interface may be provided, e.g., via an additional control apparatus 104 or via a separate platform, such as a windows platform. The command center may comprise the same features and the control apparatus 104. It may also comprise advanced features, such as asset management, building composite elements, setting the external data feeds, etc. The command center may be used as a replacement to the control apparatus 104 and/or as a tool for an assistant director to assist the show, for example by building single or composite elements and sending such composite elements to the operator of the control apparatus 104.

For smaller productions, the system can be driven solely by a single control apparatus 104 connected to the production apparatus 102 and multiviewer 106. Alternatively, in smaller productions, the system can be driven solely by a single operator using a user interface at a command center.

The channel composer 122 may perform and input more advanced or more drastic changes to the look and feel of the broadcast or available graphics. These changes can be input to the system 100, e.g., while a live broadcast is running.

In another aspect, the system may be driven via both a command center 124 and a control apparatus 104. The Command Center provides the ability to address last minute changes or organizing assets and/or other production elements in a more efficient way. The system may also be driven by a channel composer for more advanced changes.

In another aspect, a graphics operator or assistant operator may assist an operator in running the system 100. For example, the graphics operator may create composite elements, select the next graphics, or make slight modifications to the text of the graphics.

In another aspect, the graphics operator may also have Channel Composer 122 running on the same machine with a command center in order to provide the ability to make last minute changes to the look and feel of the broadcast.

Figure 2:
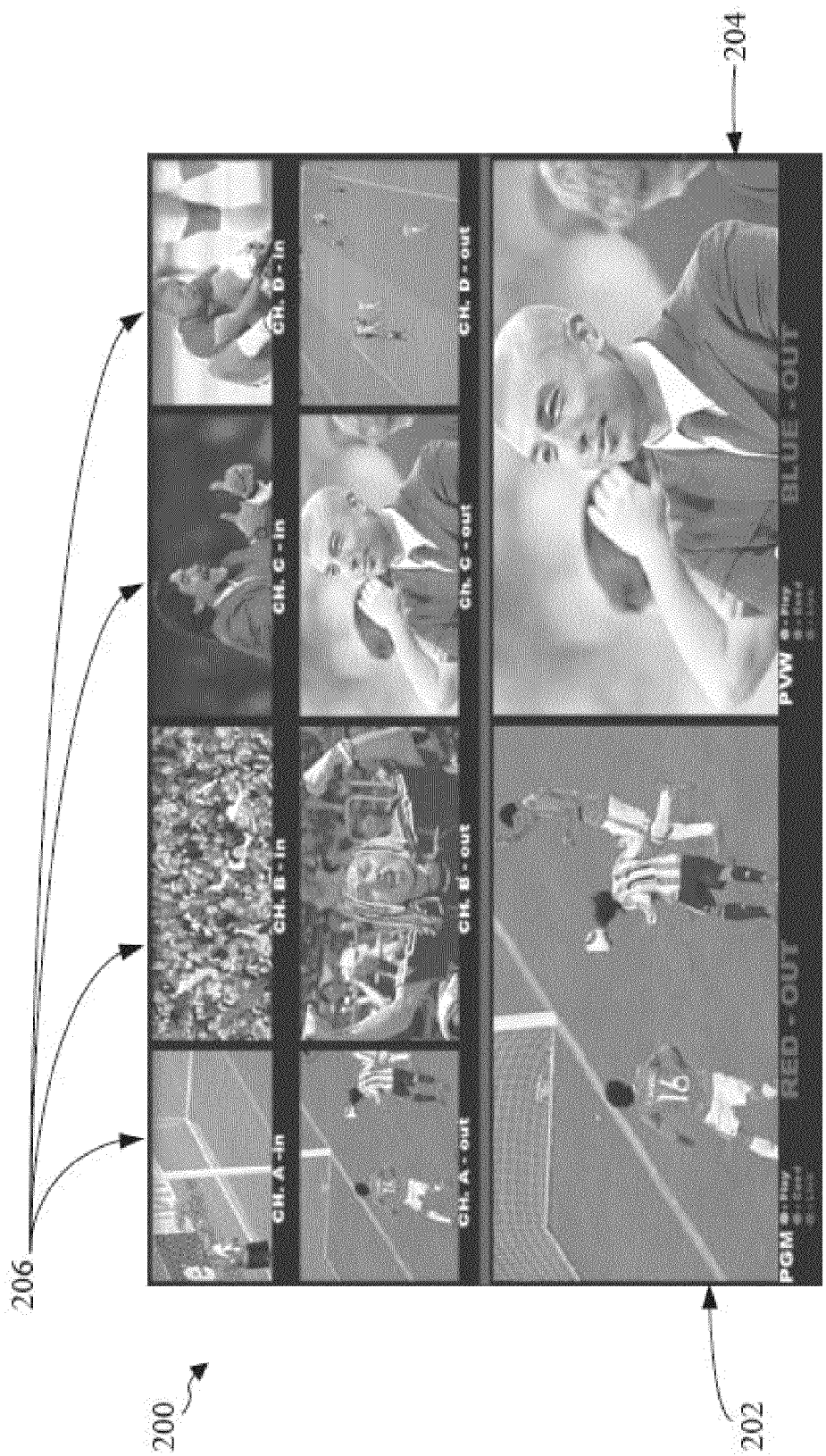
FIG. 2 illustrates an example display of a multiviewer in accordance with aspects presented herein.

FIG. 2 illustrates an example multiviewer display 200. This multiviewer may correspond to multiviewer 106 in FIG. 1. The multiviewer may be structured to receive and display visual data simultaneously in real time from a plurality of sources. This may include a plurality of visual sources, including live sources and clips or other stored sources. The multiviewer may comprise a touch screen that receives selections of displayed visual data by finger pressure on a panel of the display. Additional details regarding a touch panel that presents visual data in real-time from a plurality of sources are described in U.S. Published Patent Application No. 2007/0182864 entitled, "Broadcast Control" filed on Feb. 8, 2007, based on International Application No. PCT/AU04/00441 filed on Apr. 2, 2004, which is based on Australian Application No. 2003961532 filed on Apr. 4, 2003, the entire contents of each of which are expressly incorporated by reference herein.

One of the displayed visual data may comprise a stage preview 204, as described supra. Another may include a live visual display of the current broadcast 202. Additional visual displays may be presented of potential video sources for the broadcast. For example, visual displays 206 may represent different live camera views that can be selected for broadcast. However, the visual displays are not limited to live video sources, and may also include a visual representation of a clip or still so that a user can see the content of a clip or still before selecting it.

The camera view that is currently selected, whether for the stage 204 or for the current output 202 may include a visual indication that it has been selected, e.g., by being highlighted or framed in a contrasting color.

The stage 204 portion of the multiviewer may be used simply as a previewer. For example, the operator may select a camera view or a clip to preview. The camera view or clip may then be displayed on the stage 204 so that the operator can verify whether the camera view/clip was the desired video. Once the operator is satisfied, the user can make a selection to output the camera view/clip.

The stage 204 may also be used to generate a composited preview of a combination of production elements prior to broadcasting the composition of a plurality of production elements. For example, an operator may select the stage, and thereafter select a background, an effect, and a transition. The composited preview may be generated merely based on the user selections. Alternately, the composited preview may be held until the operator indicates that the selection is complete, e.g., by pressing a rehearse button/icon.

FIG. 3 illustrates aspects of an example control apparatus 302. Control apparatus 302 may correspond to control apparatus 104 in FIG. 1. Control apparatus 302 may include a plurality of programmable manual buttons 312 and corresponding displays 314 for each button. Each display 314 may change to identify the control provided by the corresponding button 312. Additionally, the display may be highlighted, or provide some other indication, that a button has been selected and is currently being applied to the composited scene. The selection provided by the button to the composite scene can be removed by touching the button once again.

The manual buttons may be provided in rows similar to a traditional switcher. However, each of the buttons may be programmed to any production element. A button may be assigned, or programmed, by pressing the button 312 and pressing a production element icon from the touch screen portion 306. At that point, the button is automatically programmed to apply that production element when pressed. The production element can be automatically removed when the button is pressed a second time. The button may be reprogrammed, e.g., by pressing the button 312 and, while holding the button, selecting a different production element icon on the touch screen 306.

The programmable buttons 312 may be assigned to any of the production elements. For example, buttons may be assigned to any combination of a plurality of live camera inputs, to a plurality of transitions, a plurality of effects, and a plurality of pre-produced content. The display 314 is updated to label the programmed button. For example, "cam 1" may represent a first live camera input, "logo" may represent a logo graphic effect, "cut" may indicate a cut transition, and "clip 1" may indicate a particular clip.

In addition to the display, the button itself may provide a visual indication that it has been programmed. Such an indication may include any combination of being backlit, highlighted, a change in color, etc. Additionally, a separate visual indication may be used to show an operator that a programmed button has been selected. Furthermore, variations of the indication can be used to show that the button has been assigned to different types of production elements. For example, buttons may be backlit with different colors corresponding to the different types of production elements. This enables an operator to readily identify the production elements available via the manual buttons.

In addition to the programmable button portion 304, the control apparatus 302 may also include an integrated touch screen portion 306. The touch screen portion provides a more visual display of the production elements, and can be configured to provide different layers of screens that enable user selection of the available production elements. FIGS. 5-14 illustrate example aspects that may be provided through touch screen portion 306.

Figure 4:
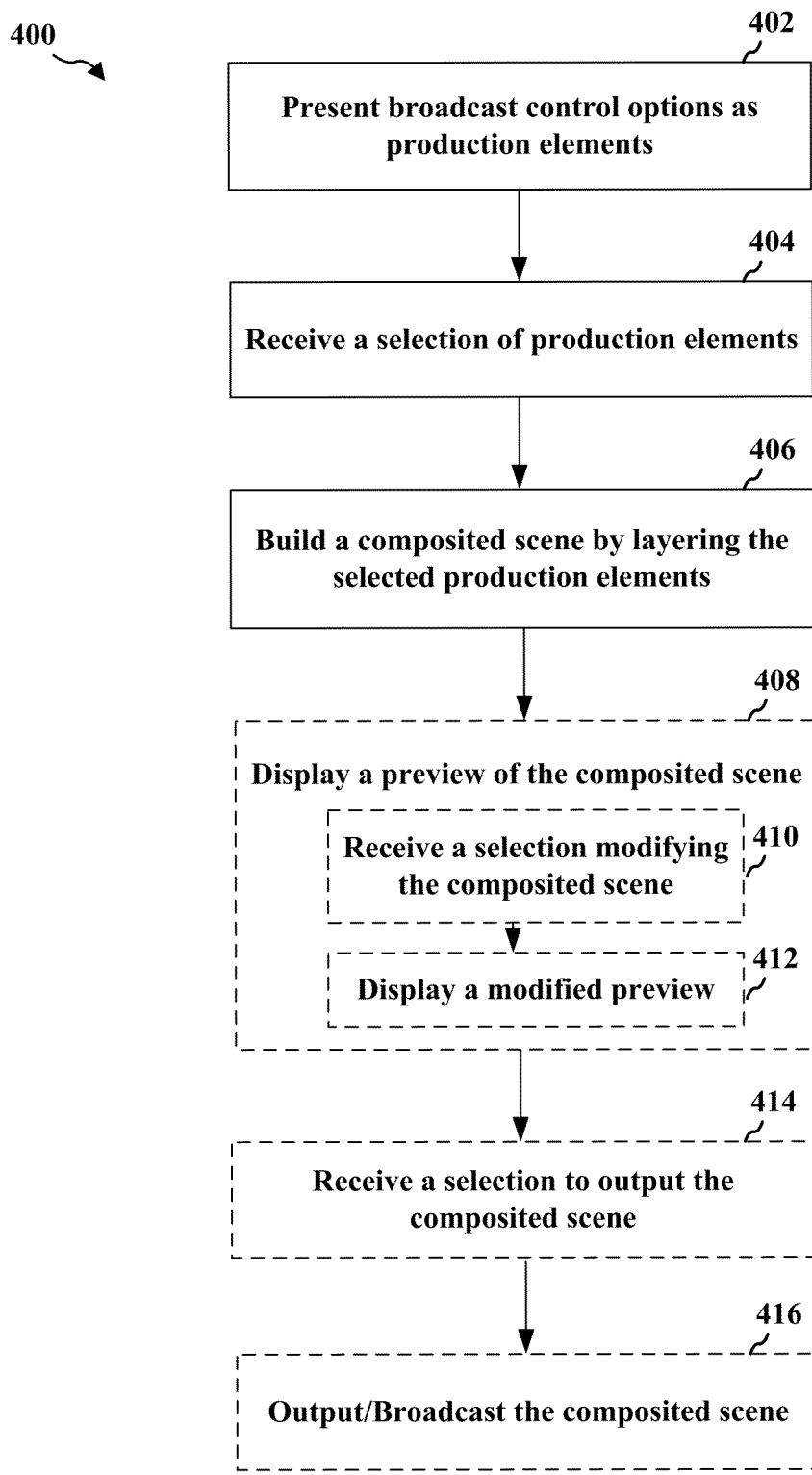
FIG. 4 illustrates an example flow chart of a method of broadcast control in accordance with aspects presented herein.

FIG. 4 is a flow chart 400 of a method of composite broadcast control. The method may be performed by a broadcast control apparatus or system.

At step 402, the broadcast control apparatus presents broadcast control options to a user as a plurality of fundamental production elements. Examples of such fundamental production elements may include a background, an effect, a transition, and a stored clip. For example, the background may optionally be combined with any of the effect, the transition, and the stored clip. In another aspect, the plurality of production elements that are presented may comprise, e.g., at least two of the background, the effect, the transition, and the stored clip. In an aspect, the presentation of the broadcast control options may be performed by a control apparatus 104, 302 or a multiviewer, e.g., 106, 200 in FIGS. 1-3. The broadcast control options may be presented visually as icons on a touch screen, e.g., as illustrated in FIGS. 3 and 5-14. Additionally, the broadcast control options may be presented to a user as manual buttons, e.g., 112 as in FIG. 1. The manual buttons may be configured to be user programmable. A display may be presented for each of the configurable manual buttons, the display indicating the manner in which the button has been programmed. Thus, the display may indicate for each button, the broadcast control option provided in connection with the button. The display may be updated as the button is configured/reconfigured so that a user is continually aware of the option represented by the button.

At step 404, the broadcast control apparatus receives a selection of fundamental production elements from an operator. In an aspect, the selection may be received via a user interface, e.g., via buttons or touch screen of control apparatus 104, multiviewer 106, command center, and channel composer in FIG. 1.

Thereafter, at step 406, the broadcast control apparatus builds a composited scene by layering the selected production elements. In an aspect, the composited scene may be built, e.g., via a graphics processing unit (GPU) having a software based architecture. The software based architecture may provide a single path that receives all video input for broadcast control and outputs a single video output for broadcast. In an aspect, the building may be performed, e.g., by production apparatus 102 in FIG. 1.

In the past, a mix effects unit, e.g., had a limited number of sources for performing effects. Complicated, rich looking output typically required multiple passes through such a mix effect unit. By providing a software based single pass, reduces the technical knowledge required to build complex output.

The composited scene may be built as part of a preview. Thereafter, a preview of the composited scene may be displayed prior to broadcasting the composited scene at 408. Optional aspects are illustrated with a dashed line in FIG. 4. The display may be performed, e.g., by a display such as multiviewer 106, 200 in FIGS. 1 and 2. The use of a preview aspect enables the user to view the overall broadcast that will be generated based on their selections. It also enables them to make modifications to the composited scene prior to outputting or broadcasting the composited scene.

Thus, displaying a preview of the composited scene may further include step 410, at which a second user selection is received to modify the composited scene. Thereafter, the composited scene can be updated/modified based on the second user selection. At 412, a modified preview of the modified/updated composited scene is displayed prior to broadcasting the composited scene. Steps 410 and 412 may be repeated until a user is satisfied with the overall composition displayed via the previewer.

Once the user is satisfied with the composited scene, the user can select the composited scene for output. This may be also accomplished through the use of a single user selection. For example, the user may push a single button or select a single icon, e.g., the take icon 720 in FIG. 5. For example, the user may simply touch the displayed preview 118, 202 of the composited scene at the multiviewer 106, 200 in order to output or broadcast the composited scene. This provides a simple, intuitive way for a person with a non-technical background to perform complex broadcast control.

Once a selection to output the composited scene is received at 414, the composited scene can be output for broadcast at 416. The selection may be received, e.g., via a user interface such as at control apparatus 104. The output may be performed, e.g., by production apparatus The preview may be displayed, e.g., at a multiviewer display such as 106, 200 in FIGS. 1 and 2. The multiviewer may further display a visual representation of at least one available production element. For example, the multiviewer may display the input received from at least one live video source and/or another video source such as a visual representation of a video clip. The multiviewer may also display a visual representation of the current output signal so that a user can readily see a composited scene being generated for preview, and a composited scene that is currently being output.

Aspects presented herein provide benefits in a variety of circumstances, including small and medium sized studios and mobiles, stadiums, fly packs, and as a sub-switch in larger productions.

FIGS. 5-14 illustrate aspects of the manner in which production elements may be organized and presented to an operator. FIGS. 5-14 present example displays that may be provided to the user as part of a user interface, e.g., via the touch screen portion 114 of control apparatus 104.

Each of the available production elements may be organized into a fundamental set of production element types, e.g., among others, background, graphics or effects, transitions, and pre-produced content. The display may include a static portion and a dynamic portion. For example, the static portion may include present each of the fundamental types of production elements so that the operator can easily select among them.

Figure 5:
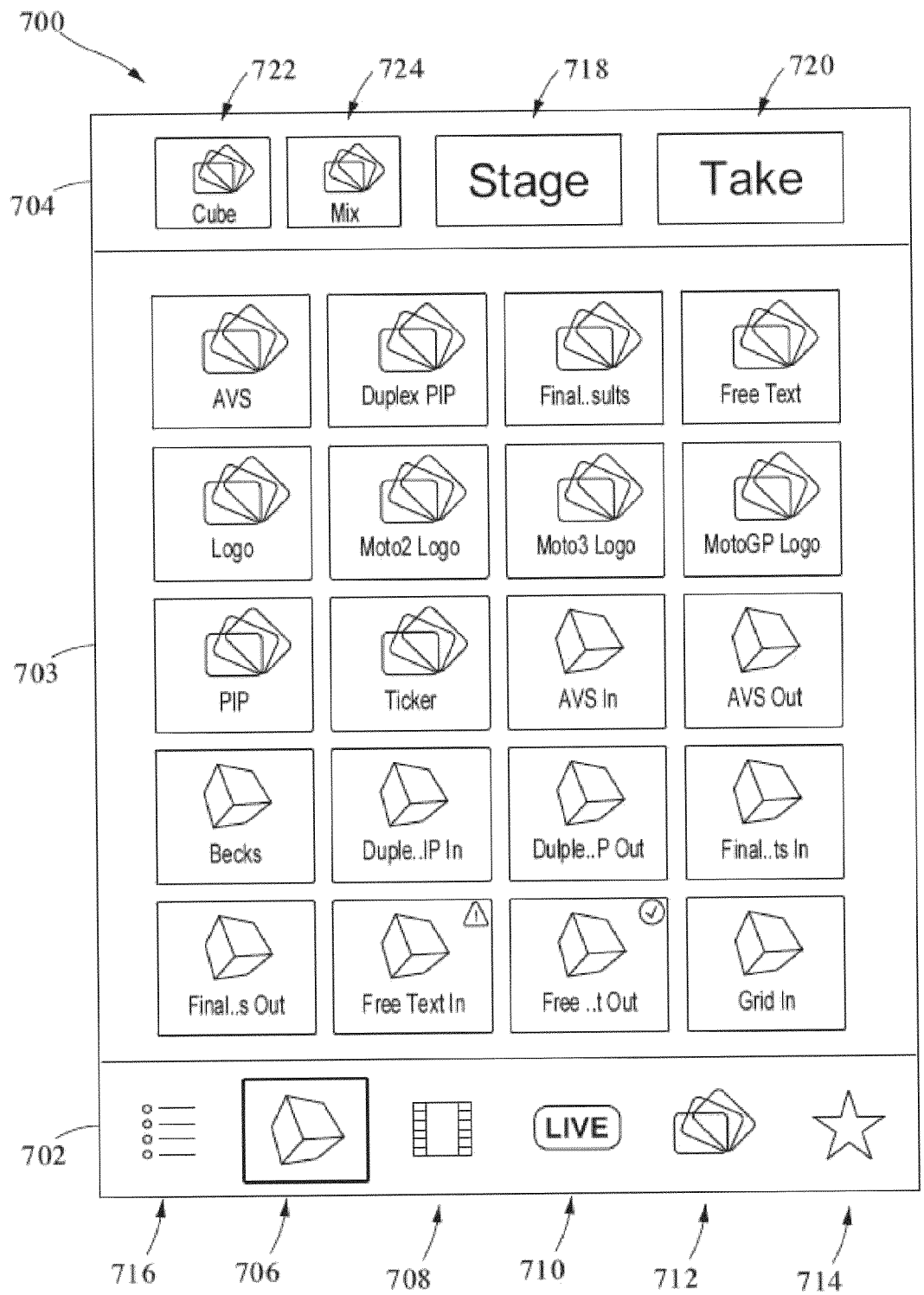
FIG. 5 illustrates an example screen shot for a control apparatus in accordance with aspects presented herein.

FIG. 5 illustrates example aspects of a display that may be presented to a user via control apparatus 104, including first static portion 702 that presents an icon 706 for effects, an icon 708 for pre-produced material, an icon 710 for live sources, and an icon 712 for transitions. Additional icons 716, 718 may be presented as described in more detail in FIGS. 12-14. When one of icons 706-712 is selected, the dynamic portion 703 of the screen changes to display the available production elements corresponding to the selected type.

In FIG. 5, the effect icon has been selected, and dynamic portion 703 illustrates a plurality of icons for the different effects that can be selected. For example, the available options include multiple logos, picture-in-picture (PIP), final standings, etc. By selecting any of the icons in the dynamic portion 703 of the display, the selected effect will be applied to the composite scene that is being built. When more options are available than can be presented within a single screen of the dynamic portion, the options may be presented in a manner that enables the operator to scroll or move the dynamic portion to see the other options or to move between multiple pages. When one of the icons is selected, its selection may be indicated to the operator through a visual indication. For example, among other visual indications, the icon may be highlighted, change color, become outline, etc. FIG. 5 illustrates the effects icon 706 being highlighted in order to indicate the effects production element type has been selected.

In FIG. 5, a second static portion 704 of the display is also illustrated. This portion may present options to the operator to enable the operator to select between the composited preview, e.g. with icon 718, and the live output, e.g., icon 720. By selecting one of these options, e.g., 718/720, the production elements being selected can be applied directly to the composited preview or to the actual live output. Additionally, once the operator is satisfied with the composited preview, the operator may automatically output the previewed combination by selecting icon 720.

Either static portion may include additional options that could be important to a user, e.g., 714, 716, 722, and 724. For example, FIG. 5 illustrates icons for two transitions included in the second static portion. Icon 722 enables the operator to select a cube transition, and icon 724 enables the operator to select a simple cut transition. The static portions 702, 704 of the display are continuously displayed to the operator thereby enabling the operator to make these selections at any point.

Icons 722 and 724 may be important, because once a transition is selected, it may be automatically applied to transition to a newly selected background source.

Figure 6:
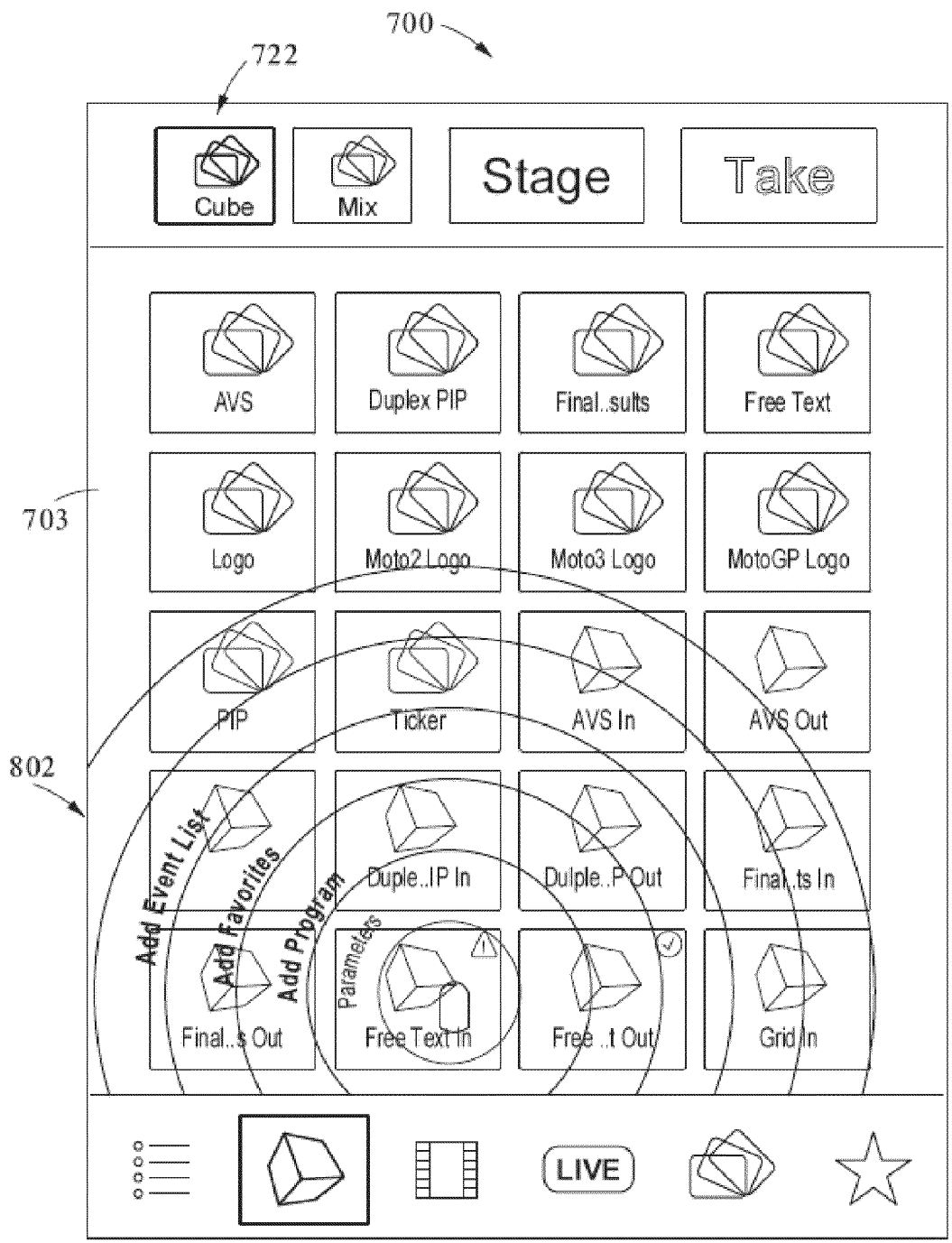
FIG. 6 illustrates an example screen shot for a control apparatus in accordance with aspects presented herein.

FIG. 6 illustrates example aspects of a display that may be presented to the user to select among parameters, add program, add favorites, add event list, and add extras. These options may enable an operator to perform tasks on production elements by selecting the appropriate one of the concentric rings. FIG. 6 also illustrates that icon 722 has been selected. Thus, when a new background source is selected, whether for the stage or for the live output, a cube transition will be applied in changing between the two sources.

Figure 7:
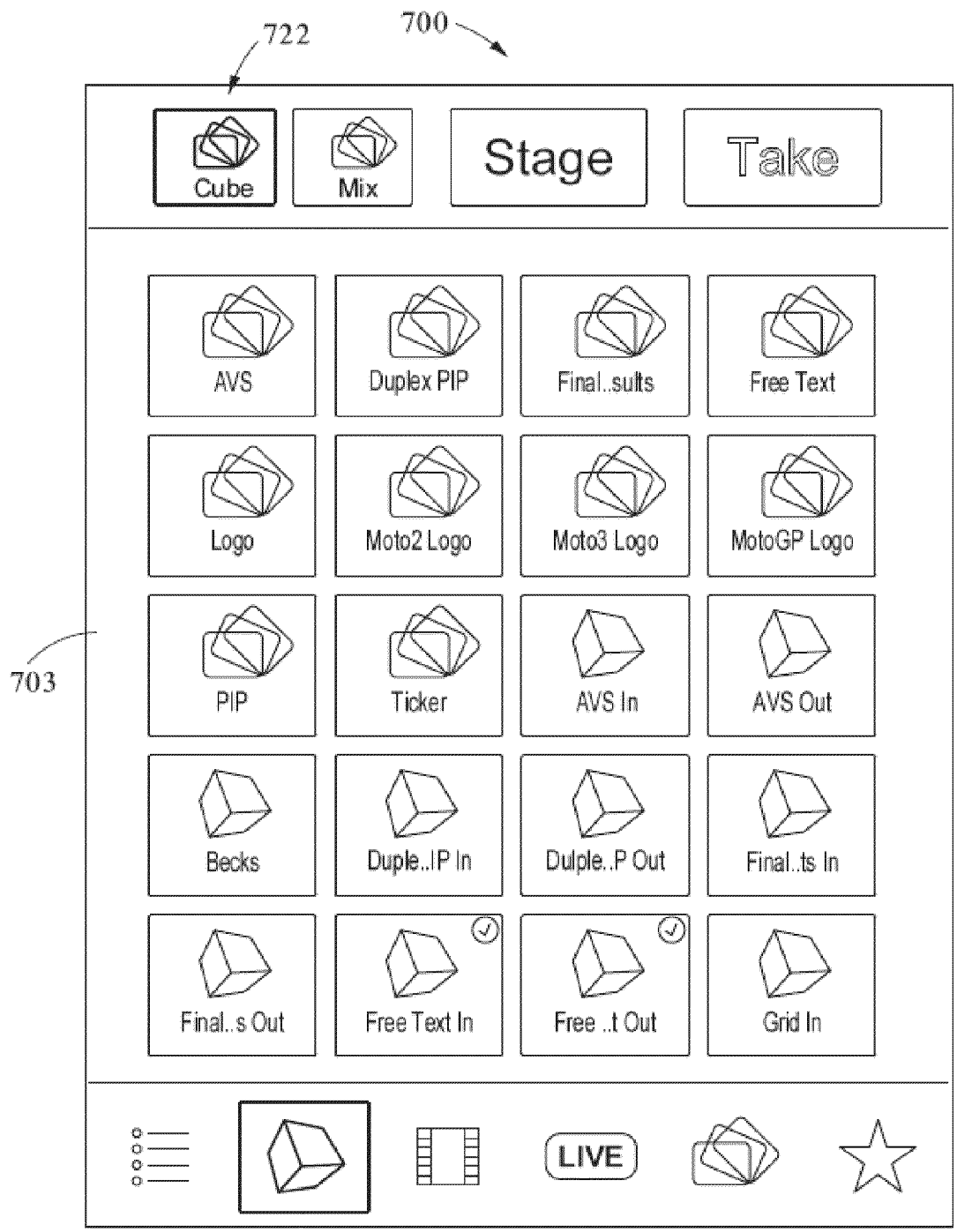
FIG. 7 illustrates an example screen shot for a control apparatus in accordance with aspects presented herein.

FIG. 7 illustrates the display where an operator can select effect elements. FIG. 7 also illustrates that effects icon 722 has been highlighted which tells the operator that the 'Cube' transition element will be to transition between all background elements.

Figure 8:
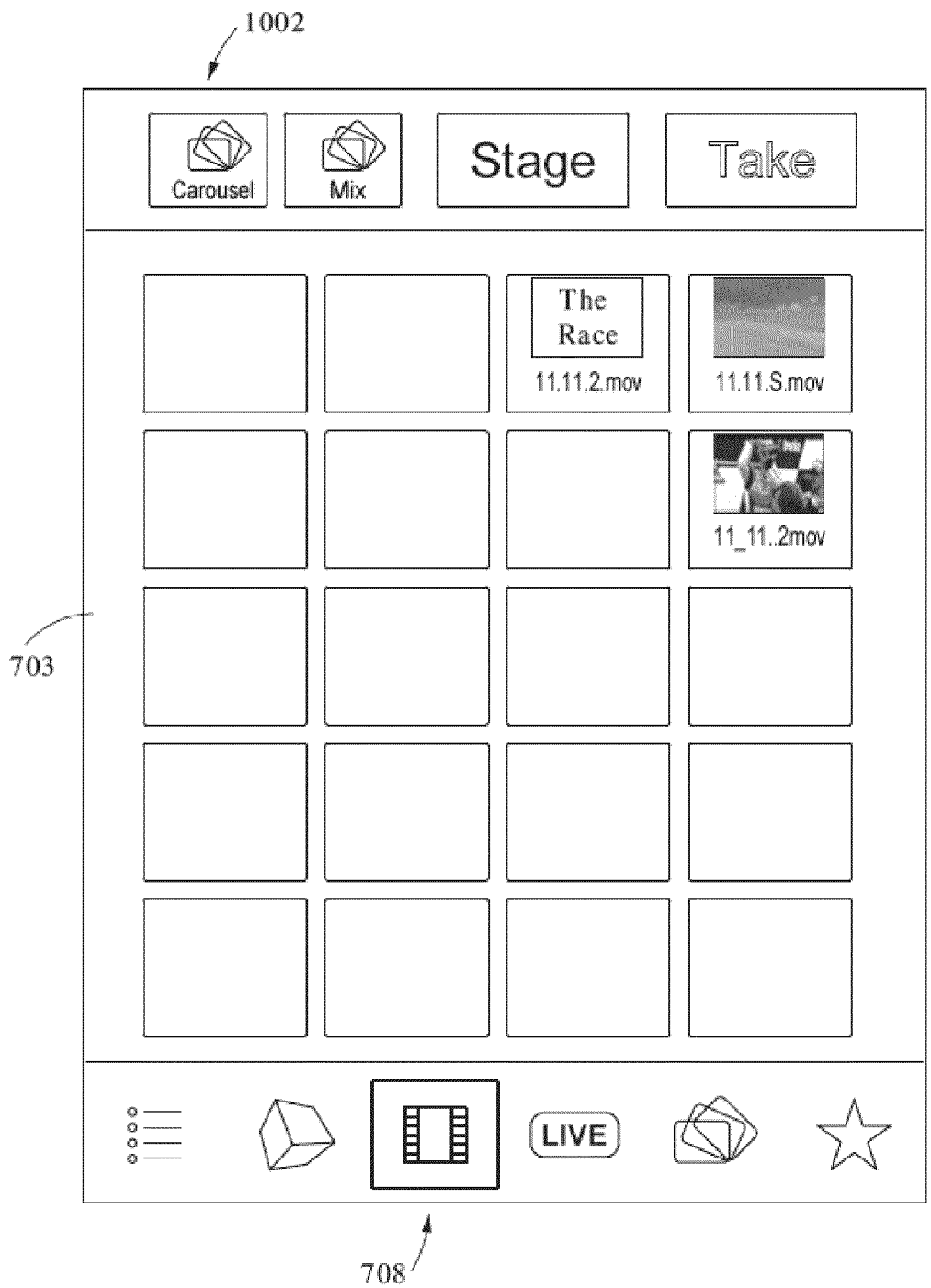
FIG. 8 illustrates an example screen shot for a control apparatus in accordance with aspects presented herein.

FIG. 8 illustrates example aspects of a display that may be presented to an operator when the pre-produced material icon 708 is selected. FIG. 8 illustrates that icons for multiple pre-produced material can be presented to the user in the dynamic portion. FIG. 8 illustrates an example in which three video clips are presented as options. The icons for the video clips may include a visual representation of the content of the clip, such as a first frame of the clip. This enables the operator to easily identify a desired clip. FIG. 8 also illustrates that a carousel icon 1002 may be presented to the user to offer a carousel transition as an option.

Figure 9:
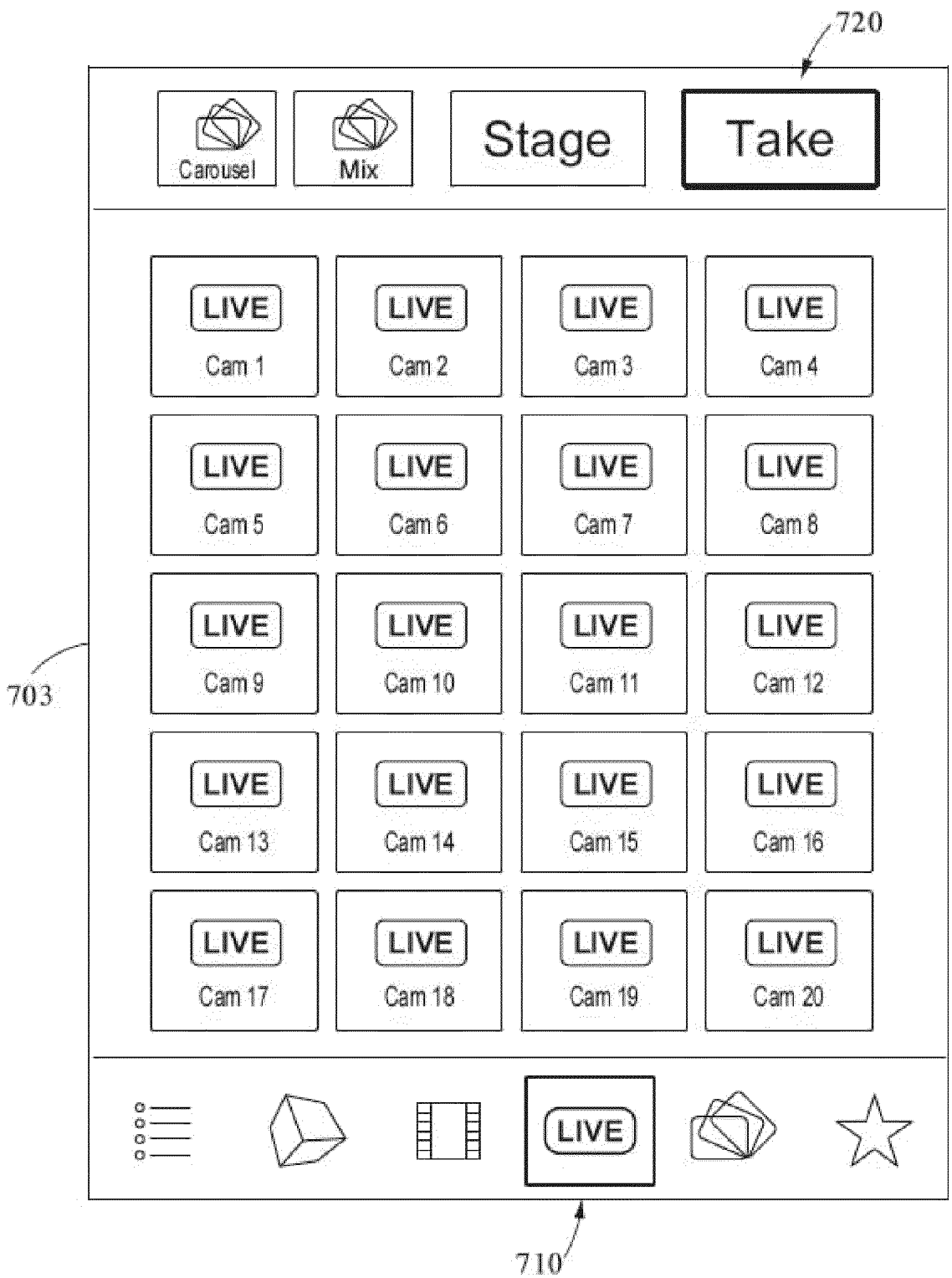
FIG. 9 illustrates an example screen shot for a control apparatus in accordance with aspects presented herein.

FIG. 9 illustrates example aspects of a display that may be presented to an operator when the live source production element type 710 is selected. The dynamic portion of the screen 703 illustrates, e.g., an icon for each of cameras 1-20. Additionally, FIG. 9 illustrates that the take icon has been selected. Therefore, when the operator selects one of the camera icons, this input source will be automatically output as the background for the live broadcast.

Figure 10:
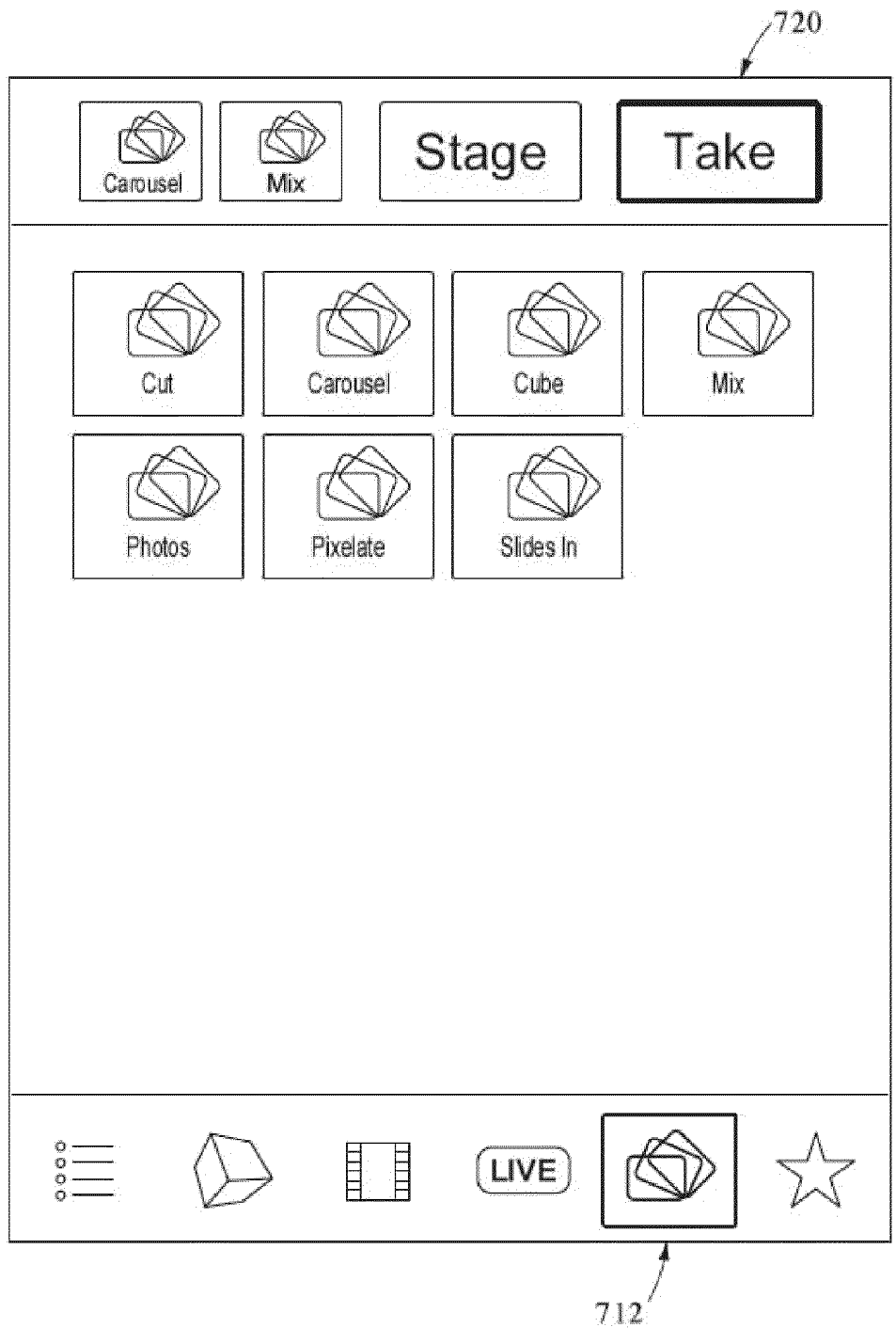
FIG. 10 illustrates an example screen shot for a control apparatus in accordance with aspects presented herein.
Figure 11:
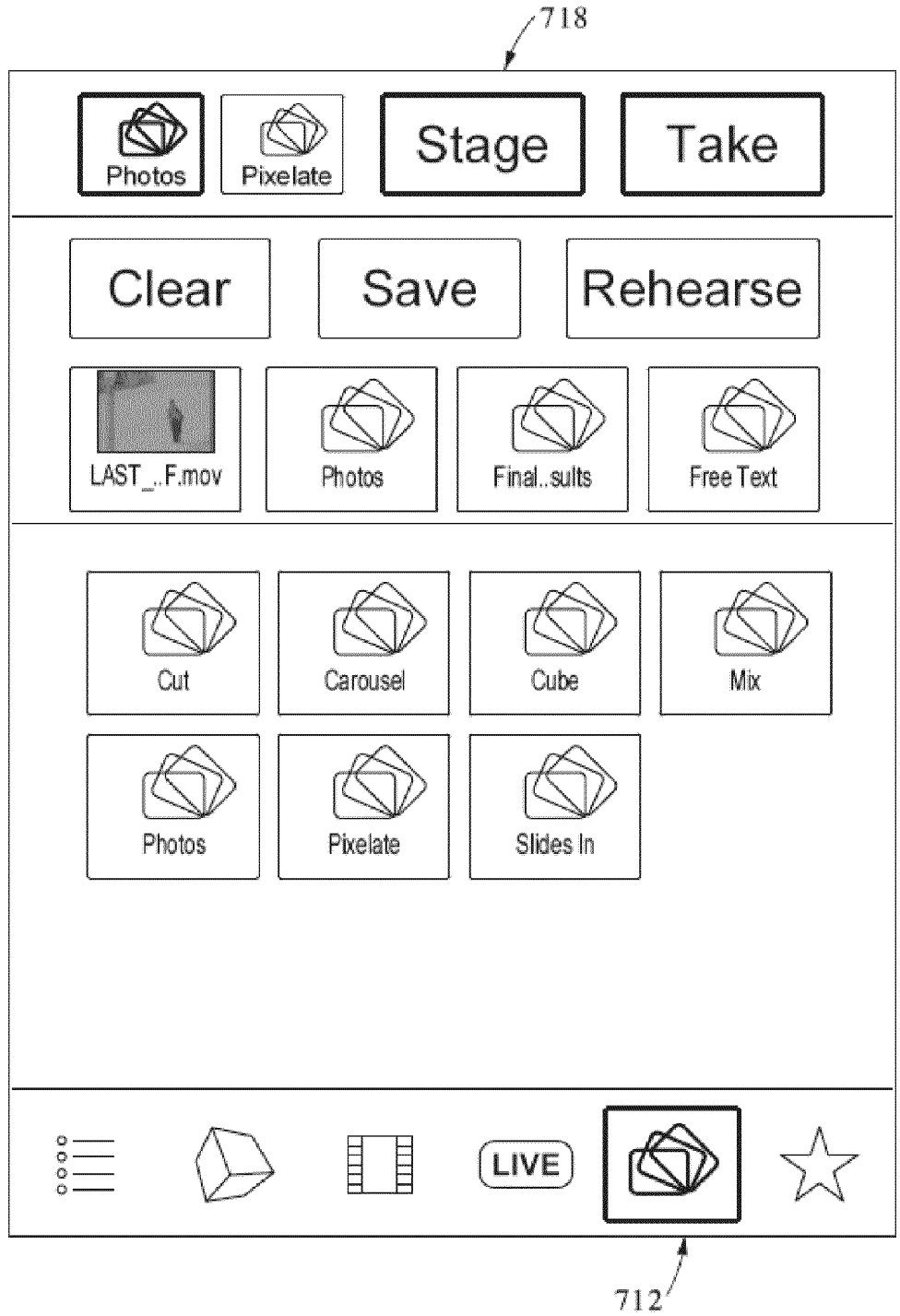
FIG. 11 illustrates an example screen shot for a control apparatus in accordance with aspects presented herein.

FIG. 10 illustrates example aspects of a display that may be presented to an operator when the transition icon 712 is selected. The dynamic portion of the screen presents, e.g., may present, among others, an icon for transitions including, cut, carousel, cube, mix, photos, pixelate, and slides in. FIG. 11 illustrates that the take icon has been selected. Therefore, when the take icon is selected, e.g., the transition may be applied as a part of the composite scene that is being built for preview.

FIG. 11 illustrates additional options that may be presented to an operator in connection with the preview or stage. FIG. 11 illustrates that additional options may be presented to the operator to enable them to clear previous selections from the composite scene, to save previously selected options for the composite scene, and to play out or preview the combinations selected for the composite scene. For example a "clear" icon may remove previous selections from the composite scene when received as a selection from the operator. A "save" icon may save previous selections for the composite scene when received as a selection from the operator. A "rehearse" icon may cause the combination of previous selections for the composite scene to be presented, e.g., via the preview portion 118 of multiviewer 106, when received as a selection from the operator.

Figure 12:
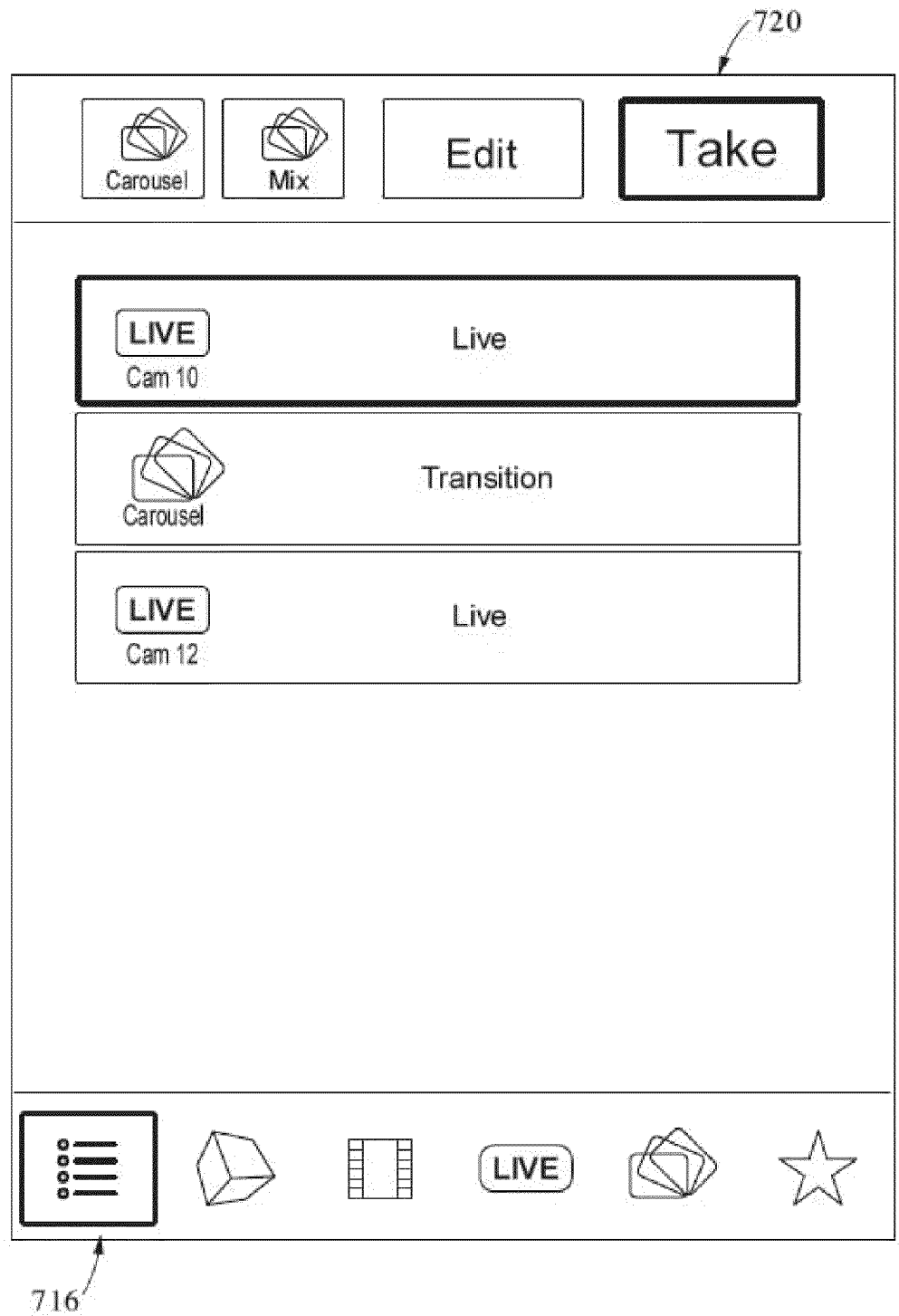
FIG. 12 illustrates an example screen shot for a control apparatus in accordance with aspects presented herein.

FIG. 12 illustrates aspects of an additional feature that may be provided as an option via control apparatus 104. In FIG. 12, an event list icon 716 may be presented as an option, e.g., via static portion 702. When the event list option is selected, as in FIG. 12, the control apparatus may enable the operator to create, store, and move through scripted events. The control apparatus can receive a group of relevant production elements and save these production elements in a stacked order, as illustrated in FIG. 12 for "live camera 10," "carousel transition," and "live camera 12." Any number of stacked production elements may be selected and stored. Then, the operator may move through the different production elements by simply selecting the displayed icon in the stack. FIG. 12 illustrates that the take icon has been selected. Thus, these production elements will be applied directly to the live broadcast. This option may be helpful for scripted events, such as talk shows. Such an event may include multiple guests, each having a different camera following them, and pre-produced clips regarding the guests. The operator can stack a set of production elements corresponding to the script for the talk show. Then, as the show progresses, the operator can apply the different production elements, including different camera views, clips of the guests, etc. by simply selecting an option in the stack.

Figure 13:
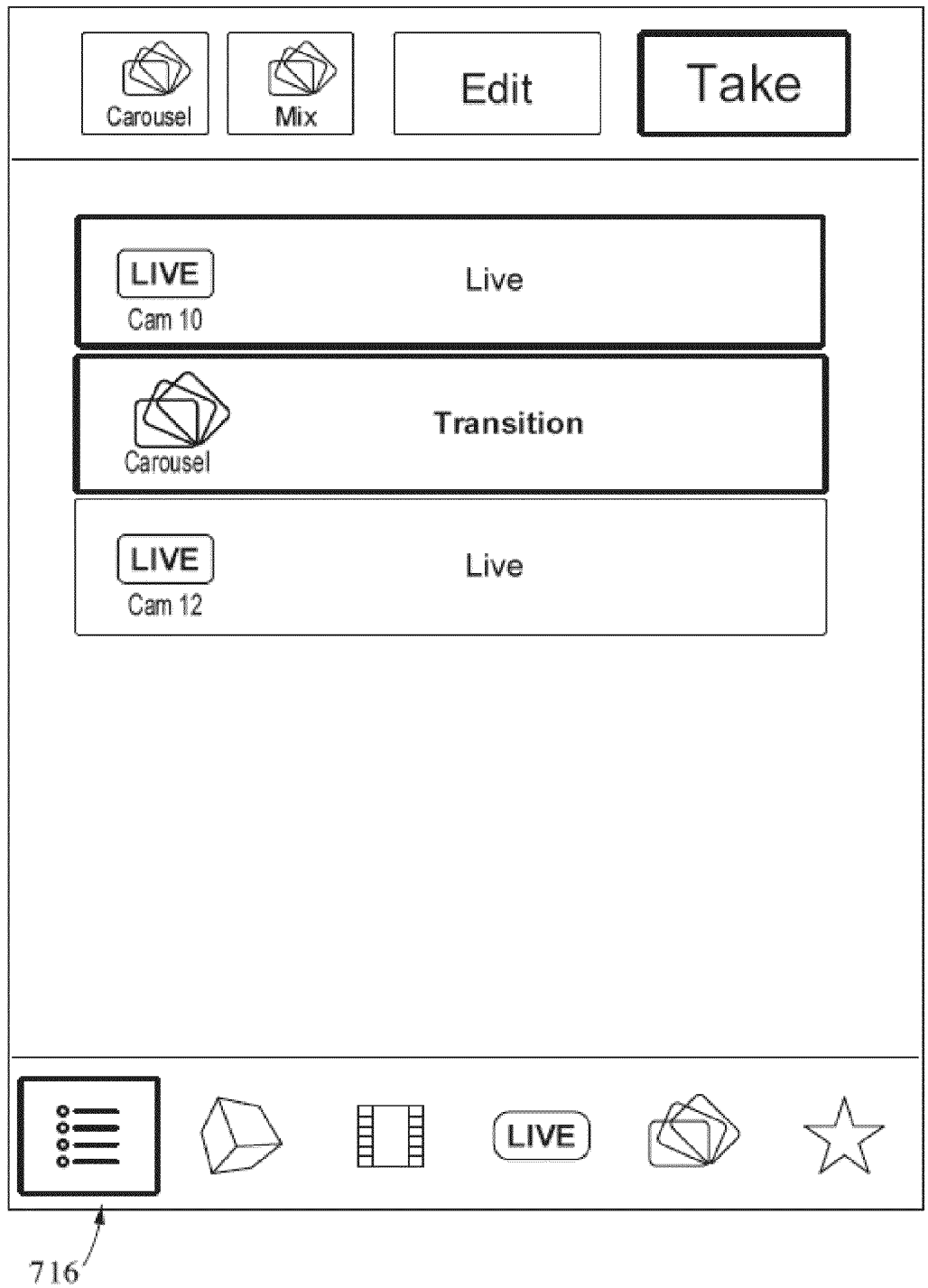
FIG. 13 illustrates an example screen shot for a control apparatus in accordance with aspects presented herein.

FIG. 13 illustrates aspects of another view of the event list option, showing that live camera 10 is currently selected and that the carousel transition has been selected. Thus, the current background output in the live broadcast is live camera 10. When the operator selects live camera 12, a carousel transition may be automatically be applied in changing between live camera 10 and live camera 12. Then, live camera 12 will be output as normal. Although the event list has been described as moving through the list in order, the operator may also make selections in an order different than the stacked options. For example, in FIG. 13, after selecting camera 12, the operator may again select camera 10 in order to return to that camera view. This enables the operator to apply the stacked elements in an organized manner, while at the same time allowing the operator to respond to unanticipated events.

Figure 14:
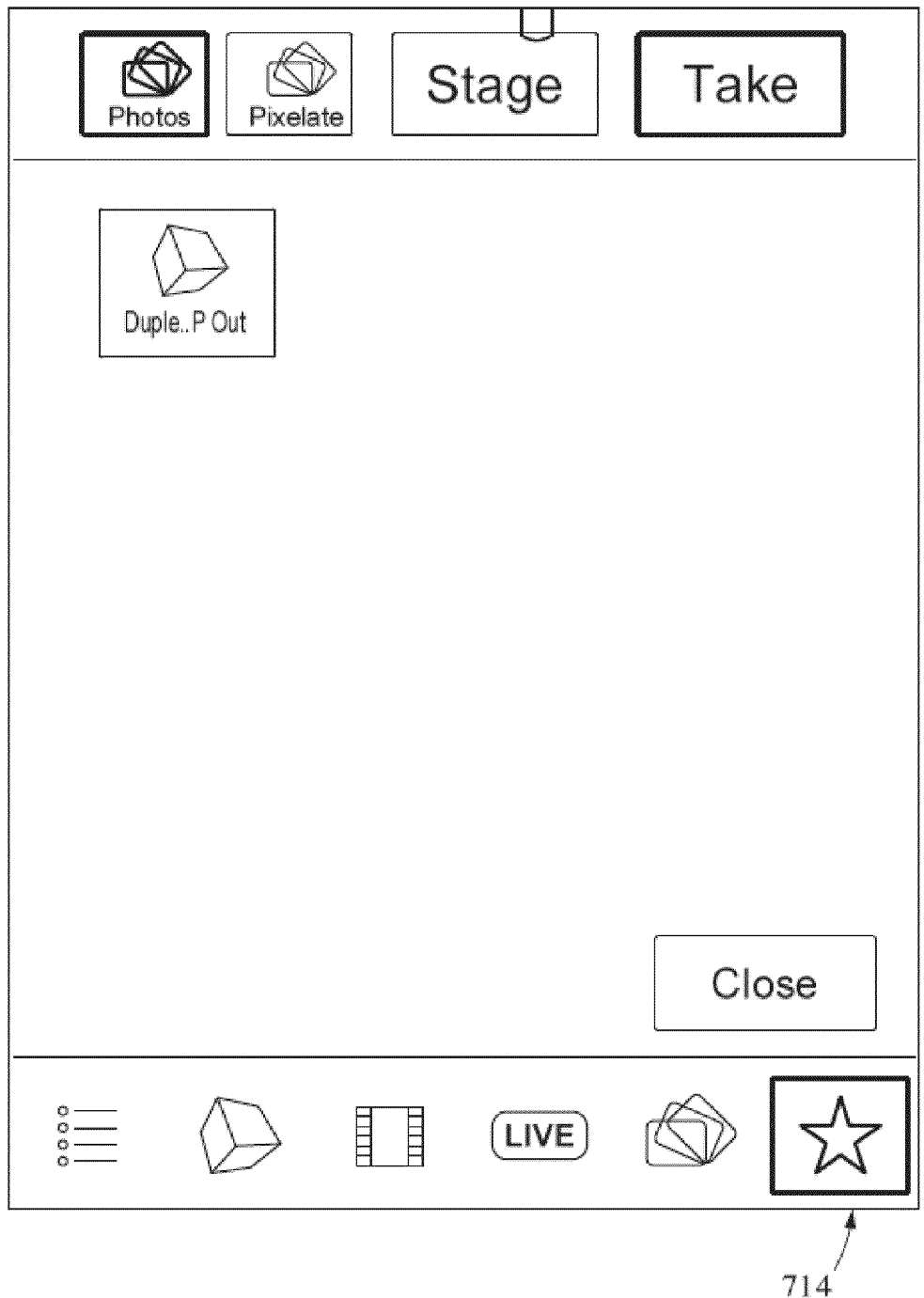
FIG. 14 illustrates an example screen shot for a control apparatus in accordance with aspects presented herein.

FIG. 14 illustrates an additional feature in which the favorites icon 714 is selected. With this feature an operator can choose production elements to be stored on their favorites display for ease of use.

Figure 15:
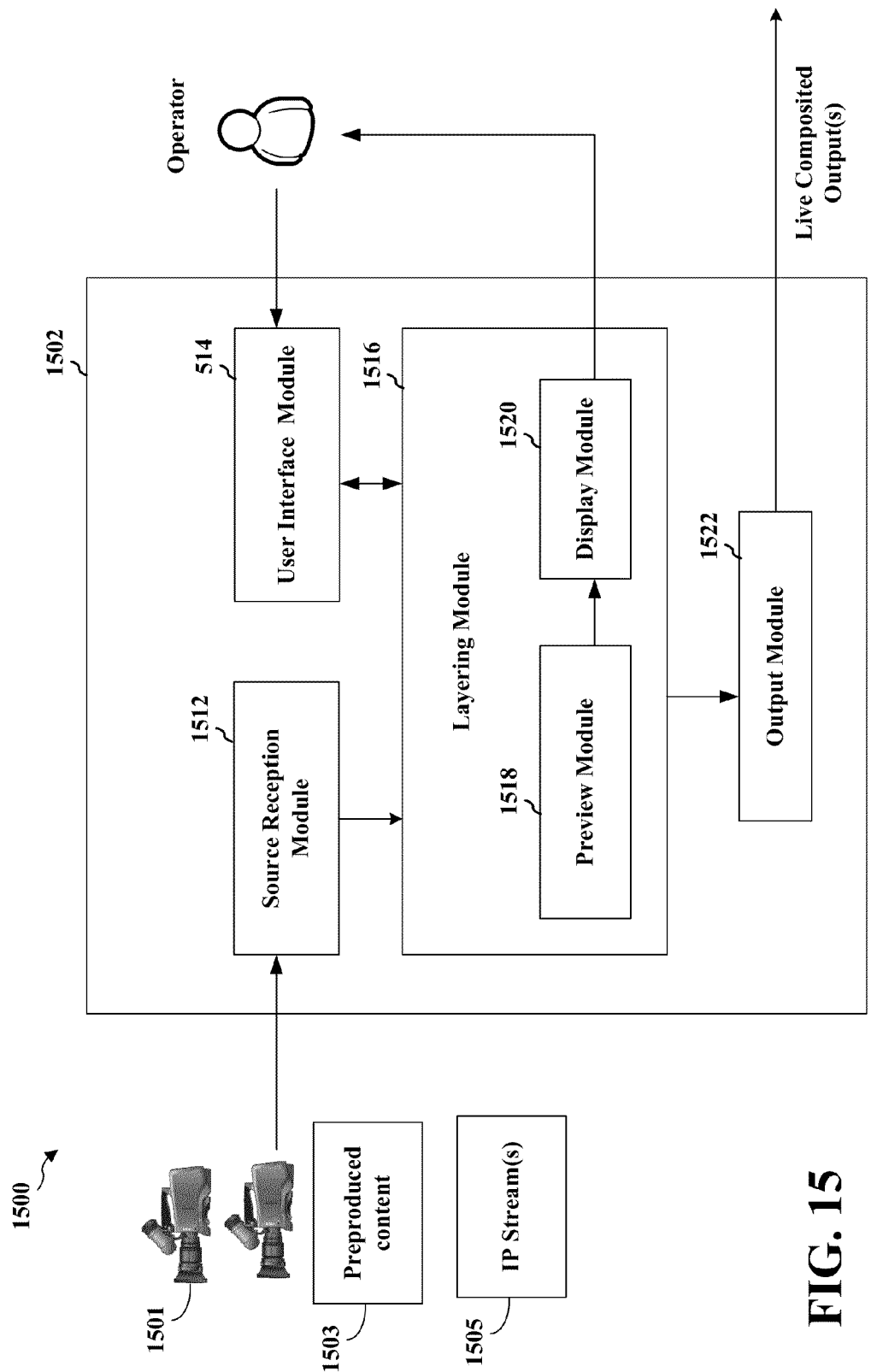
FIG. 15 illustrates an example conceptual data flow diagram illustrating the data flow between different modules/means/components in an exemplary broadcast control apparatus/system in accordance with aspects presented herein.

FIG. 15 is a conceptual data flow diagram 1500 illustrating the data flow between different modules/means/components in an exemplary broadcast control apparatus 1502. The apparatus may include any combination of aspects of a production apparatus 102, control apparatus 104, multiviewer 106, channel composer 122, and command center 124. The apparatus includes a module 1512 that receives source input, e.g., any of live camera input 1501, pre-produced content such as video clips 1503, IP stream(s) 1503, etc., a module 1514 that receives information from a user interface, such as user selections of production elements. User interface module may also provide information to the user interface, such as presenting broadcast control options to the user as a plurality of fundamental production elements.

The broadcast control apparatus may comprise a layering module 1516 that builds a composite scene by layering the selected production elements. The layering module 1516 may optionally comprise a preview module 1518 that generates a preview of the composited scene and a display module 1520 that displays the preview of the composited scene prior to broadcasting the composited scene.

The broadcast control apparatus 1502 may also include an output module 1522 that outputs a composited live broadcast.

The apparatus may include additional modules that perform each of the steps of described in connection with FIG. 4. As such, each step in the aforementioned flow charts of FIG. 4 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Several aspects of broadcast control systems have been presented with reference to various apparatus and methods. These apparatus and methods described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Figure 16:
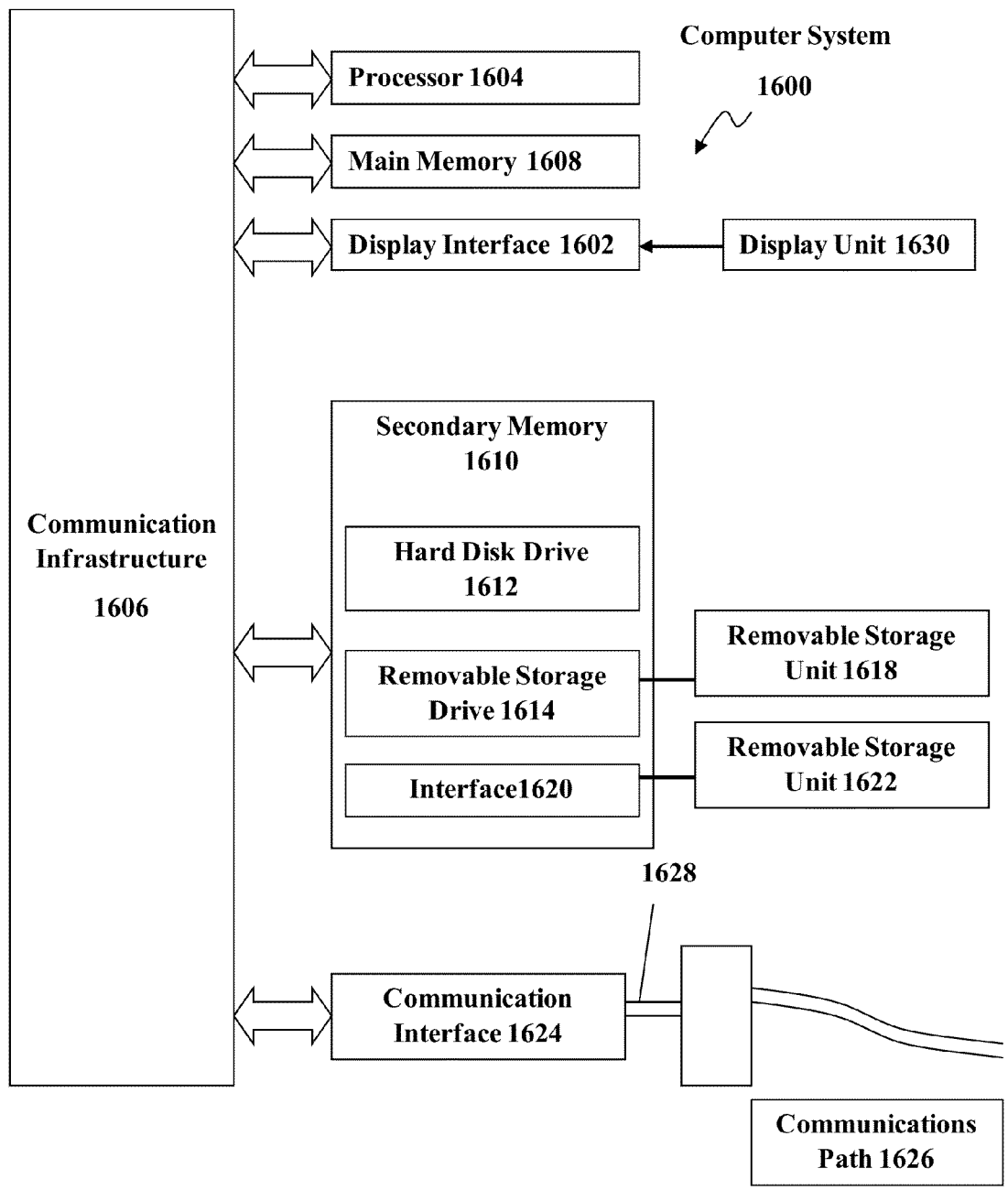
FIG. 16 illustrates an example system diagram of various hardware components and other features, for use in accordance with aspects presented herein.

FIG. 16 presents an example system diagram of various hardware components and other features, for use in accordance with aspects presented herein. Aspects presented herein may be implemented using hardware, software, or a combination thereof and may be implemented in one or more computer systems or other processing systems. Aspects include one or more computer systems capable of carrying out the functionality described herein. An example of such a computer system 1600 is shown in FIG. 16.

Computer system 1600 includes one or more processors, such as processor 1604. The processor 1604 is connected to a communication infrastructure 1606 (e.g., a communications bus, cross-over bar, or network). Various software implementations are described in terms of this example computer system. After reading this description, it will become apparent to a person skilled in the relevant art(s) how to implement aspects presented herein using other computer systems and/or architectures.

By way of example, an element, or any portion of an element, or any combination of elements may be implemented with a "processing system" that includes one or more processors. The processing system further includes at least one of the modules 1512, 1514, 1516, 1518, 1520, and 1522. The modules may be software modules running in the processor 1604, resident/stored in memory 1610, e.g., a computer readable medium, one or more hardware modules coupled to the processor 1604, or some combination thereof. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Computer system 1600 can include a display interface 1602 that forwards graphics, text, and other data from the communication infrastructure 1606 (or from a frame buffer not shown) for display on a display unit 1630. Computer system 1600 also includes a main memory 1608, preferably random access memory (RAM), and may also include a secondary memory 1610. The secondary memory 1610 may include, for example, a hard disk drive 1612 and/or a removable storage drive 1614, representing a floppy disk drive, a magnetic tape drive, an optical disk drive, etc. The removable storage drive 1614 reads from and/or writes to a removable storage unit 1618 in a well-known manner. Removable storage unit 1618, represents a floppy disk, magnetic tape, optical disk, etc., which is read by and written to removable storage drive 1614. As will be appreciated, the removable storage unit 1618 includes a computer usable storage medium having stored therein computer software and/or data.

In alternative implementations, secondary memory 1610 may include other similar devices for allowing computer programs or other instructions to be loaded into computer system 1600. Such devices may include, for example, a removable storage unit 1622 and an interface 1620. Examples of such may include a program cartridge and cartridge interface (such as that found in video game devices), a removable memory chip (such as an erasable programmable read only memory (EPROM), or programmable read only memory (PROM)) and associated socket, and other removable storage units 1622 and interfaces 1620, which allow software and data to be transferred from the removable storage unit 1622 to computer system 1600. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Computer system 1600 may also include a communications interface 1624. Communications interface 1624 allows software and data to be transferred between computer system 1600 and external devices. Examples of communications interface 1624 may include a modem, a network interface (such as an Ethernet card), a communications port, a Personal Computer Memory Card International Association (PCM-CIA) slot and card, etc. Software and data transferred via communications interface 1624 are in the form of signals 1628, which may be electronic, electromagnetic, optical or other signals capable of being received by communications interface 1624. These signals 1628 are provided to communications interface 1624 via a communications path (e.g., channel) 1626. This path 1626 carries signals 1628 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 1780, a hard disk installed in hard disk drive 1612, and signals 1628. These computer program products provide software to the computer system 1600. Aspects may be directed to such computer program products.

Computer programs (also referred to as computer control logic) are stored in main memory 1608 and/or secondary memory 1610. Computer programs may also be received via communications interface 1624. Such computer programs, when executed, enable the computer system 1600 to perform the features of the aspects discussed herein. In particular, the computer programs, when executed, enable the processor 1610 to perform the features of the presented herein. Accordingly, such computer programs represent controllers of the computer system 1600.

If implemented in software, the functions may be stored on or encoded as one or more instructions or code on a computer-readable medium. Computer-readable media includes computer storage media. Thus, when aspects are the implemented using software, the software may be stored in a computer program product and loaded into computer system 1600 using removable storage drive 1614, hard drive 1612, or communications interface 1620. The control logic (software), when executed by the processor 1604, causes the processor 1604 to perform the functions as described herein. In another example implementation, aspects may be implemented primarily in hardware using, for example, hardware components, such as application specific integrated circuits (ASICs). Implementation of the hardware state machine so as to perform the functions described herein will be apparent to persons skilled in the relevant art(s).

Aspects may also be implemented using a combination of both hardware and software. Accordingly, in one or more example aspects, the functions described may be implemented in hardware, software, firmware, or any combination thereof.

Figure 17:
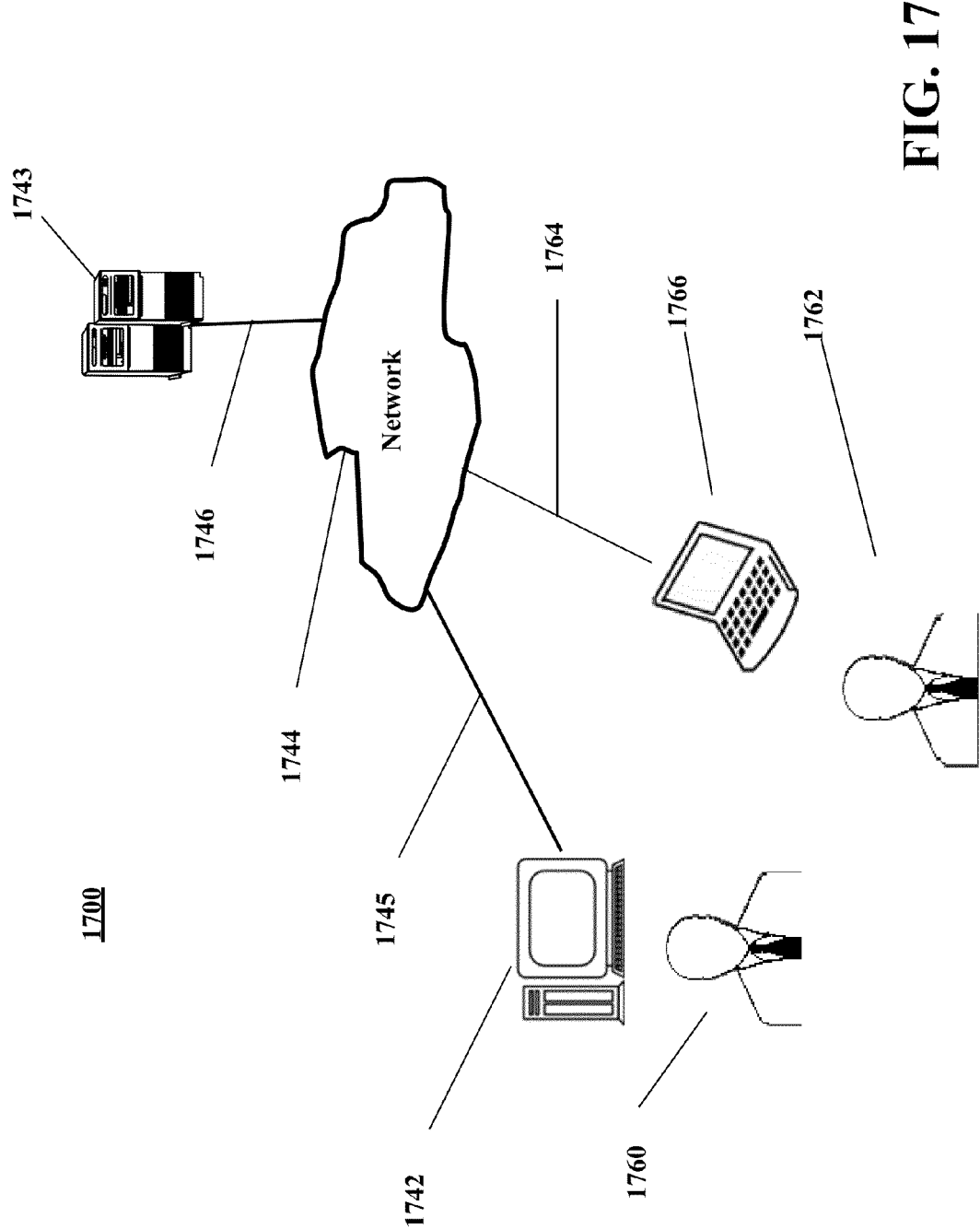
FIG. 17 illustrates is a block diagram of various example system components, in accordance with aspects presented herein.

FIG. 17 is a block diagram of various example system components, in accordance with aspects presented herein. FIG. 17 shows a communication system 1700 usable in accordance with aspects presented herein. The communication system 1700 includes one or more accessors 1760, 1762 (also referred to interchangeably herein as one or more "users") and one or more terminals 1742, 1766. In one aspect, data for use in accordance with aspects presented herein is, for example, input and/or accessed by accessors 1760, 1762 via terminals 1742, 1766, such as personal computers (PCs), minicomputers, mainframe computers, microcomputers, telephonic devices, or wireless devices, such as personal digital assistants ("PDAs") or a hand-held wireless devices coupled to a server 1743, such as a PC, minicomputer, mainframe computer, microcomputer, or other device having a processor and a repository for data and/or connection to a repository for data, via, for example, a network 1744, such as the Internet or an intranet, and couplings 1745, 1746, 1764. The couplings 1745, 1746, and 1764 include, for example, wired, wireless, or fiberoptic links. In another aspect, the method and system presented herein may operate in a stand-alone environment, such as on a single terminal.

While aspects have been described in conjunction with the example implementations outlined above, various alternatives, modifications, variations, improvements, and/or substantial equivalents, whether known or that are or may be presently unforeseen, may become apparent to those having at least ordinary skill in the art. Accordingly, the example implementations of the invention, as set forth above, are intended to be illustrative, not limiting. Various changes may be made without departing from the spirit and scope of the aspects. Therefore, the aspects are intended to embrace all known or later-developed alternatives, modifications, variations, improvements, and/or substantial equivalents.

Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of composite broadcast control, comprising:
presenting, at a user interface on a display, broadcast control options to a user as a plurality of fundamental production elements, each fundamental production element displayed as an icon on the user interface, the plurality of fundamental production elements comprising at least one of a background, an effect, a transition, and a stored clip, wherein the background can be combined with any of the effect, the transition, and the stored clip;
presenting a first portion of the user interface, wherein the first portion is static and presents a plurality of production element type icons, one for each of the fundamental production elements available at the user interface;
presenting a second portion of the user interface, wherein the second portion changes depending upon which of the plurality of production element type icons is selected, the second portion presents a plurality of production element icons corresponding to the selected production element type;
receiving a selection of fundamental production elements via selection of the corresponding icons; and
building, via a processor, a composited scene for broadcast output by layering the selected production elements, wherein a layer corresponding to a fundamental production element can be applied or removed from the composited scene by selection of the corresponding icon, wherein a specific production element is applied to the composited scene by selection of its corresponding icon.

2. The method of claim 1, wherein the composited scene is built via graphics processing unit having a software based architecture.

3. The method of claim 2, wherein the software based architecture provides a single path that receives all video input for broadcast control and outputs a single video output for broadcast.

4. The method of claim 1, wherein the composited scene is built within a previewer, the method further comprising:
displaying a preview of the composited scene prior to broadcasting the composited scene.

5. The method of claim 4, further comprising:
receiving a second user selection modifying the composited scene; and
displaying the modified preview of the modified composited scene prior to broadcasting the composited scene.

6. The method of claim 4, further comprising:
receiving a selection to output the composited scene for which a preview is displayed; and
outputting the composited scene for broadcast.

7. The method of claim 6, wherein the selection to output the composited scene comprises a single user selection.

8. The method of claim 4, wherein the preview is displayed at a multi-previewer display that further displays a visual representation of at least one available production element.

9. The method of claim 8, wherein the displayed visual representation comprises at least one of a live video source and a video source.

10. The method of claim 1, wherein the broadcast control options are presented to the user as manual buttons, wherein the manual buttons are configured to be user programmable.

11. The method of claim 10, wherein the manual buttons comprise a display that indicates the broadcast control option by the user.

12. The method of claim 1, further comprising a third portion of the user interface, wherein the third portion is static and presents an icon for a broadcast output and an icon for a preview, wherein a selected production element is applied to a broadcast output composited scene or a preview composited scene depending on whether the broadcast output icon is selected or the preview icon is selected.

13. The method of claim 12, wherein the composited scene is generated for preview when the preview icon is selected, the method further comprising:
automatically outputting the composited scene when the broadcast output icon is selected.

14. An apparatus for composite broadcast control, comprising:
means for presenting broadcast control options to a user as a plurality of fundamental production elements, each fundamental production element displayed as an icon on a user interface, the plurality of fundamental production elements comprising at least one of a background an effect, a transition, and a stored clip, wherein the background can be combined with any of the effect, the transition, and the stored clip, including presenting a first portion of the user interface, wherein the first portion is static and presents a plurality of production element type icons, one for each of the fundamental production elements available at the user interface, and presenting a second portion of the user interface, wherein the second portion changes depending upon which of the plurality of production element type icons is selected, the second portion presents a plurality of production element icons corresponding to the selected production element type;
means for receiving a selection of fundamental production elements via selection of the corresponding icons; and
means for building a composited scene by layering the selected production elements, wherein a layer corresponding to a fundamental production element can be applied or removed from the composited scene by selection of the corresponding icon, wherein a specific production element is applied to the composited scene by selection of its corresponding icon.

15. The apparatus of claim 14, wherein the composited scene is built within a previewer, the method further comprising:
means for displaying a preview of the composited scene prior to broadcasting the composited scene.

16. The apparatus of claim 14, wherein the user interface further comprises a third portion, wherein the third portion is static and presents an icon for a broadcast output and an icon for a preview, wherein a selected production element is applied to a broadcast output composited scene or a preview composited scene depending on whether the broadcast output icon is selected or the preview icon is selected.

17. The apparatus of claim 14, wherein the means for building a composited scene comprises a graphics processing unit having a software based architecture.

18. The apparatus of claim 17, wherein the software based architecture provides a single path that receives all video input for broadcast control and outputs a single video output for broadcast.

19. An apparatus for composite broadcast control, comprising:
a processing system configured to:
present broadcast control options to a user as a plurality of fundamental production elements, each fundamental production element displayed as an icon on a user interface, the plurality of fundamental production elements comprising at least one of a background an effect, a transition, and a stored clip, wherein the background can be combined with any of the effect, the transition, and the stored clip;
present a first portion of the user interface, wherein the first portion is static and presents a plurality of production element type icons, one for each of the fundamental production elements available at the user interface;
present a second portion of the user interface, wherein the second portion changes depending upon which of the plurality of production element type icons is selected, the second portion presents a plurality of production element icons corresponding to the selected production element type;
receive a selection of fundamental production elements via selection of the corresponding icons; and
build a composited scene by layering the selected production elements, wherein a layer corresponding to a fundamental production element can be applied or removed from the composited scene by selection of the corresponding icon, wherein a specific production element is applied to the composite scene by selection of its corresponding icon.

20. The apparatus of claim 19, wherein the composited scene is built within a previewer, the processing system being further configured to:
display a preview of the composited scene prior to broadcasting the composited scene.

21. The apparatus of claim 20, the processing system being further configured to:
receive a second user selection modifying the composited scene; and
display the modified preview of the modified composited scene prior to broadcasting the composited scene.

22. The apparatus of claim 20, the processing system being further configured to:
receive a selection to output the composited scene for which a preview is displayed; and
output the composited scene for broadcast.

23. The apparatus of claim 19, wherein the user interface further comprises a third portion, wherein the third portion is static and presents an icon for a broadcast output and an icon for a preview, wherein a selected production element is applied to a broadcast output composited scene or a preview composited scene depending on whether the broadcast output icon is selected or the preview icon is selected.

24. The apparatus of claim 19, wherein the apparatus comprises a composited scene comprises a graphics processing unit configured to build the composited scene, the graphics processing unit having a software based architecture.

25. The apparatus of claim 24, wherein the software based architecture provides a single path that receives all video input for broadcast control and outputs a single video output for broadcast.

26. A non-transitory computer program product, comprising:
a non-transitory computer-readable medium comprising code for causing a computer to:
present broadcast control options to a user as a plurality of fundamental production elements, each fundamental production element displayed as an icon on a user interface, the plurality of fundamental production elements comprising at least one of a background an effect, a transition, and a stored clip, wherein the background can be combined with any of the effect, the transition, and the stored clip;
present a first portion of the user interface, wherein the first portion is static and presents a plurality of production element type icons, one for each of the fundamental production elements available at the user interface;
present a second portion of the user interface, wherein the second portion changes depending upon which of the plurality of production element type icons is selected, the second portion presents a plurality of production element icons corresponding to the selected production element type;
receive a selection of fundamental production elements via selection of the corresponding icons; and
build a composited scene by layering the selected production elements, wherein a layer corresponding to a fundamental production element can be applied or removed from the composited scene by selection of the corresponding icon, wherein a specific production element is applied to the composited scene by selection of its corresponding icon.

27. The computer program product of claim 26, wherein the computer-readable medium further comprises code for causing a computer to:
display a preview of the composited scene prior to broadcasting the composited scene.

28. The computer program product of claim 26, wherein the user interface further comprises a third portion, wherein the third portion is static and presents an icon for a broadcast output and an icon for a preview, wherein a selected production element is applied to a broadcast output composited scene or a preview composited scene depending on whether the broadcast output icon is selected or the preview icon is selected.

29. The computer program product of claim 26, wherein the composited scene is built via graphics processing unit having a software based architecture.

30. The computer program product of claim 29, wherein the software based architecture provides a single path that receives all video input for broadcast control and outputs a single video output for broadcast.

* * * * *